United States Patent
Umemoto et al.

(10) Patent No.: US 9,028,763 B2
(45) Date of Patent: May 12, 2015

(54) EXHAUST PURIFICATION SYSTEM OF INTERNAL COMBUSTION ENGINE

(75) Inventors: Kazuhiro Umemoto, Ebina (JP); Kohei Yoshida, Gotenba (JP); Mikio Inoue, Numazu (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 225 days.

(21) Appl. No.: 13/581,186

(22) PCT Filed: Nov. 30, 2011

(86) PCT No.: PCT/JP2011/077663
§ 371 (c)(1),
(2), (4) Date: Aug. 24, 2012

(87) PCT Pub. No.: WO2013/080330
PCT Pub. Date: Jun. 6, 2013

(65) Prior Publication Data
US 2013/0136659 A1    May 30, 2013

(51) Int. Cl.
*B01D 50/00* (2006.01)
*B01D 53/94* (2006.01)
(Continued)

(52) U.S. Cl.
CPC ........ *B01D 53/9431* (2013.01); *B01D 53/9409* (2013.01); *B01D 2251/208* (2013.01);
(Continued)

(58) Field of Classification Search
CPC . B01D 53/8531; F01N 3/0842; F01N 3/0814; F01N 3/2033; F01N 3/2013; F01N 2510/06
USPC ............. 422/177, 180, 171; 60/285, 286, 301
See application file for complete search history.

(56) References Cited

U.S. PATENT DOCUMENTS 5,052,178 A    10/1991    Clerc et al.
5,057,483 A    10/1991    Wan
(Continued)

FOREIGN PATENT DOCUMENTS

CN    101454081 A    6/2009
CN    101600860 A    12/2009
(Continued)

OTHER PUBLICATIONS

U.S. Appl. No. 13/582,909, filed Sep. 5, 2012, in the name of Kazuhiro Umemoto et al.
(Continued)

*Primary Examiner* — Tom P Duong
(74) *Attorney, Agent, or Firm* — Oliff PLC

(57) ABSTRACT

An exhaust purification system of an internal combustion engine is provided with an exhaust purification catalyst which includes an upstream side catalyst and a downstream side catalyst and which makes $NO_X$ and hydrocarbons react. The upstream side catalyst has an oxidation ability, while the downstream side catalyst carries precious metal catalyst particles on an exhaust flow surface and is formed with basic exhaust flow surface parts. The exhaust purification catalyst makes the concentration of hydrocarbons vibrate by within a predetermined range of amplitude and by within a predetermined range of period so as to remove the $NO_X$. The upstream side catalyst has a high efficiency temperature at which hydrocarbons can be partially oxidized by a predetermined efficiency.

6 Claims, 18 Drawing Sheets

(51) Int. Cl.
*F01N 3/20* (2006.01)
*F01N 3/08* (2006.01)
*F01N 3/10* (2006.01)
*F02D 41/02* (2006.01)
*F02D 41/40* (2006.01)
*F01N 13/00* (2010.01)

(52) U.S. Cl.
CPC . *B01D2255/1021* (2013.01); *B01D 2255/1025* (2013.01); *B01D 2255/204* (2013.01); *B01D 2258/012* (2013.01); *F01N 3/2033* (2013.01); *F01N 3/0814* (2013.01); *F01N 3/0842* (2013.01); *F01N 3/0871* (2013.01); *F01N 3/106* (2013.01); *F01N 3/2026* (2013.01); *F02D 41/0275* (2013.01); *F01N 2240/30* (2013.01); *F01N 2510/06* (2013.01); *F01N 2900/1602* (2013.01); *F02D 41/025* (2013.01); *F02D 41/405* (2013.01); *F01N 13/0097* (2014.06); *Y02T 10/44* (2013.01); *Y02T 10/26* (2013.01)

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis et al. |
| 7,063,642 | B1 | 6/2006 | Hu et al. |
| 7,073,325 | B2 | 7/2006 | Nakatani et al. |
| 7,082,753 | B2 | 8/2006 | Dalla Betta et al. |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 | 11/2007 | Uchida et al. |
| 7,332,135 | B2 * | 2/2008 | Gandhi et al. ............ 422/177 |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 | 3/2009 | Nakano et al. |
| 7,549,284 | B2 | 6/2009 | Ilhoshi et al. |
| 7,703,275 | B2 | 4/2010 | Asanuma et al. |
| 7,707,821 | B1 | 5/2010 | Legare |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 | 10/2012 | Handa et al. |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2003/0010020 | A1 | 1/2003 | Taga et al. |
| 2003/0040432 | A1 | 2/2003 | Beall et al. |
| 2003/0101713 | A1 | 6/2003 | Dalla Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 * | 5/2006 | Bernler et al. ............ 60/295 |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 * | 6/2007 | Reuter ............ 60/286 |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 | 4/2009 | Tsujimoto et al. |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |

(56) References Cited

FOREIGN PATENT DOCUMENTS

| | | |
|---|---|---|
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-09-220440 | 8/1997 |
| JP | 11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | 2004-308526 | 11/2004 |
| JP | 2004-316458 | 11/2004 |
| JP | A-2005-61340 | 3/2005 |
| JP | A-2005-113801 | 4/2005 |
| JP | A-2005-171853 | 6/2005 |
| JP | 2005-177738 | 7/2005 |
| JP | A-2006-501390 | 1/2006 |
| JP | 2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | 2008-69769 | 3/2008 |
| JP | 2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | 2009-114879 | 5/2009 |
| JP | A-2009-112967 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | 2009-191823 | 8/2009 |
| JP | 2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 A1 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/016822 | 2/2009 |
| WO | WO 2009/056958 | 5/2009 |
| WO | WO 2009/082035 | 7/2009 |
| WO | WO 2011/114499 | 9/2011 |
| WO | WO 2011/114501 | 9/2011 |
| WO | WO 2011/118044 | 9/2011 |

OTHER PUBLICATIONS

U.S. Appl. No. 13/578,148, filed Aug. 9, 2012, in the name of Kazuhiro Umemoto et al.
Jun. 18, 2014 Office Action issued in U.S. Appl. No. 13/582,909.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Dec. 21, 2010 International Search Report issued in International Patent Application No. PCT/JP2010/065449 (with translation).
Dec. 27, 2011 International Search Report issued in International Patent Application No. PCT/JP2011/075618 (with translation).
Jun. 15, 2010 International Search Report issued in International Patent Application No. PCT/JP2010/054730 (with translation).
Nov. 22, 2010 International Search Report issued in International Patent Application No. PCT/JP2010/065186 (with translation).
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 19, 2014 Office Action issued in U.S. Appl. No, 13/264,594.
Jun. 21, 2011 International Search Report issued in International Patent Application No. PCT/JP2011/059880 (with translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303 (with translation).
Mar. 15, 2011 International Search Report issued in International Patent Application No. PCT/JP2011/053429 (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264 (with translation).
May 2, 2014 Office Action issued in U.S. Appl. No. 13/263,660.
Mar. 28, 2014 Notice of Allowance issued in U.S. Appl. No. 13/582,862.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2010 International Search Report issued in International Patent Application No. PCT/JP2010/063135.
Oct. 26, 2012 Office Action issued in U.S. Appl. No. 13/202,692.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
May 7, 2014 Office Action issued in U.S. Appl. No. 13/264,062.
May 8, 2014 Office Action issued in U.S. Appl. No. 13/375,674.
U.S. Appl. No. 13/202,692 in the name of Umemoto et al., filed Sep. 20, 2011.
U.S. Appl. No. 13/202,733 in the name of Bisaui et al., filed Sep. 30, 2011.
U.S. Appl. No. 13/257,789 in the name of Nishioka et al., filed Oct. 14, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.

(56) References Cited

OTHER PUBLICATIONS

U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/262,858 in the name of Bisaiji et al., filed Oct. 4, 2011,.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,230 in the name of Bisadi et al., filed Oct. 13, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/580,000 in the name of Bisaiji et al., filed Aug. 20, 2012.
U.S. Appl. No. 13/582,862 in the name of Uenishi et al., filed Sep. 5, 2012.
U.S. Appl. No. 13/202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 International Search Report issued in International Patent Application No. PCT/5132010/054731 (with translation).
Jun. 29, 2010 International Search Report issued in International Patent Application No. PCT/JP2010/056345.
Jun. 15, 2010 International Search Report issued in International Patent Application No. PCT/JP2010/054729.
Sep. 13, 2011 International Search Report issued in International Patent Application No. PCT/JP2011/066628 (with translation).
Jun. 20, 2012 Search Report issued in European Patent Application No. 10845966.0.
Apr. 4, 2013 Office Action issued in U.S. Appl. No. 13/255,710.
Oct. 24, 2013 Office Action issued in U.S. Appl. No. 13/255,710.
Jan. 17, 2013 Office Action issued in U.S. Appl. No. 13/202,733.
Jan. 22, 2014 Office Action issued in U.S. Appl. No. 13/499,211.
May 27, 2014 Office Action issued in U.S. Appl. No. 13/255,710.
Oct. 2, 2014 Office Action issued in U.S. Appl. No. 13/582,862.
Jun. 15, 2010 Written Opinion issued in PCT/JP2010/054740 (with translation).
Sep. 18, 2014 Notice of Allowance issued in U.S. Appl. No. 13/255,710.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
U.S. Appl. No. 13/502,210 in the name of Bisaiji et al., filed Apr. 16, 2012.
U.S. Appl. No. 13/499,211 in the name of Bisaiji et al., filed Mar. 29, 2012.
U.S. Appl. No. 13/934,080 in the name of Bisaiji et al., filed Jul. 2, 2013.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Dec. 22, 2014 Office Action issued in U.S. Appl. No. 13/264,230.

\* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The exhaust gas of diesel engines, gasoline engines, and other internal combustion engines includes, for example, carbon monoxide (CO), unburned fuel (HC), nitrogen oxides ($NO_X$), particulate matter (PM), and other constituents. The internal combustion engines are mounted with exhaust purification systems for removing these constituents.

Japanese Patent Publication (A) No. 2007-154794 discloses an exhaust purification system of an internal combustion engine which is provided with a plurality of branch passages, exhaust purification catalysts which are arranged in the branch passages, and fuel addition valves which are arranged at the upstream sides of the exhaust purification catalysts. This exhaust purification system is provided with heater-equipped catalysts at the upstream sides of the exhaust purification catalysts of part of the branch passages among the plurality of branch passages and reduces the flow rates of exhaust of the branch passages which are provided with the heater-equipped catalysts when warming up the exhaust purification catalysts. Further, this discloses to concentratedly run the exhaust through the other branch passages to warm the exhaust purification catalysts at the other branch passages. For the branch passages reduced in exhaust flow rates, the heater-equipped catalysts are electrified to warm up the exhaust purification catalysts. Further, this publication discloses to stop the electrification and inject fuel from fuel addition valves when the heater-equipped catalysts reach the activation temperature so as to raise the temperature of the exhaust by the oxidation reaction of the fuel occurring at the heater-equipped catalysts.

CITATIONS LIST

Patent Literature

PLT 1: Japanese Patent Publication (A) No. 2007-154794

SUMMARY OF INVENTION

Technical Problem

As a method for removing nitrogen oxides which are contained in the exhaust, arrangement of an $NO_X$ storage catalyst in an engine exhaust passage has been known. The $NO_X$ storage catalyst has the function of storing $NO_X$ which is contained in the exhaust when the air-fuel ratio of the inflowing exhaust gas is lean and releasing the stored $NO_X$ and reducing the $NO_X$ when the air-fuel ratio of the inflowing exhaust becomes rich.

The above publication discloses to arrange $NO_X$ storage catalysts as exhaust purification catalysts for raising the temperature. The exhaust purification system which is disclosed in the above publication is disclosed to raise the temperatures of the heater-equipped catalysts which are arranged at the upstream sides of the $NO_X$ storage catalysts so as to raise the temperature of the exhaust which flows into the $NO_X$ storage catalysts and activate the $NO_X$ storage catalysts in a short time. At the time of startup etc., it is therefore possible to raise the $NO_X$ storage catalysts to the activation temperature or more in a short time and remove the $NO_X$. In this regard, it is possible to raise the temperature of the $NO_X$ storage catalysts to the activation temperature or more so as to increase the $NO_X$ removal rate, but if the temperature becomes too high, the $NO_X$ removal rate sometimes falls.

The present invention has as its object the provision of an exhaust purification system of an internal combustion engine which is excellent in performance in removing nitrogen oxides.

Solution to Problem

An exhaust purification system of an internal combustion engine of the present invention is provided inside the engine exhaust passage with an exhaust purification catalyst which causes the $NO_X$ and hydrocarbons which are contained in the exhaust to react. The exhaust purification catalyst includes an upstream side catalyst and a downstream side catalyst. The upstream side catalyst has an oxidizing ability, while the downstream side catalyst carries precious metal catalyst particles on an exhaust flow surface and has basic exhaust flow surface parts formed around the catalyst particles. The exhaust purification catalyst has the property of reducing the $NO_X$ which is contained in the exhaust if making a concentration of hydrocarbons which flow into the exhaust purification catalyst vibrate by within a predetermined range of amplitude and by within a predetermined range of period and has the property of the amount of storage of $NO_X$ which is contained in the exhaust increasing if making a vibration period of the hydrocarbon concentration longer than a predetermined range. The system is formed so that, at the time of engine operation, it performs control to make the concentration of hydrocarbons which flow into the exhaust purification catalyst vibrate by within a predetermined range of amplitude and by within a predetermined range of period and reduce the $NO_X$ which is contained in the exhaust at the exhaust purification catalyst. The exhaust purification system is further provided with a temperature control device which adjusts the temperature of the upstream side catalyst. The exhaust purification catalyst makes the concentration of hydrocarbons vibrate by within a predetermined range of amplitude and by within a predetermined range of period so as to partially oxidize at least part of the hydrocarbons at the upstream side catalyst. The upstream side catalyst has a high efficiency temperature at which partial oxidation is possible by a predetermined efficiency when partially oxidizing the hydrocarbons. The temperature control device adjusts the temperature of the upstream side catalyst so that the upstream side catalyst becomes less than the high efficiency temperature in the time period when feeding hydrocarbons and so that the upstream side catalyst becomes the high efficiency temperature or more after feeding the hydrocarbons.

In the above-mentioned invention, the temperature control device can make the temperature of the upstream catalyst rise after the exhaust purification catalyst is fed with hydrocarbons and the upstream side catalyst adsorbs the hydrocarbons.

In the above-mentioned invention, a judgment temperature of the upstream side catalyst can be determined in advance based on the high efficiency temperature of the upstream side catalyst, and the temperature control device can detect the temperature of the upstream side catalyst and, when the temperature of the upstream side catalyst is less than the judgment temperature, can use the difference between the judgment temperature and the temperature of the upstream side catalyst as the basis to raise the temperature of the upstream side catalyst.

In the above-mentioned invention, the upstream side catalyst can be configured by an electric heating type catalyst, and the temperature control device can electrify the upstream side catalyst so as to raise the temperature of the upstream side catalyst.

In the above-mentioned invention, the temperature control device can perform auxiliary injection after main injection for producing output in the combustion chambers and thereby feed light fuel to the upstream side catalyst and can make the fuel oxidize in the upstream side catalyst and thereby raise the temperature of the upstream side catalyst.

In the above-mentioned invention, the exhaust purification catalysts can be made a catalyst comprised of an upstream side catalyst and a downstream side catalyst formed integrally.

Advantageous Effects of Invention

According to the present invention, it is possible to provide an exhaust purification system of an internal combustion engine which is excellent in performance in removing nitrogen oxides.

DESCRIPTION OF EMBODIMENTS

Referring to FIG. 1 to FIG. 28B, an exhaust purification system of an internal combustion engine in an embodiment will be explained. In the present embodiment, a compression ignition type of internal combustion engine which is mounted in a vehicle will be taken up as an example for the explanation.

Figure 1:
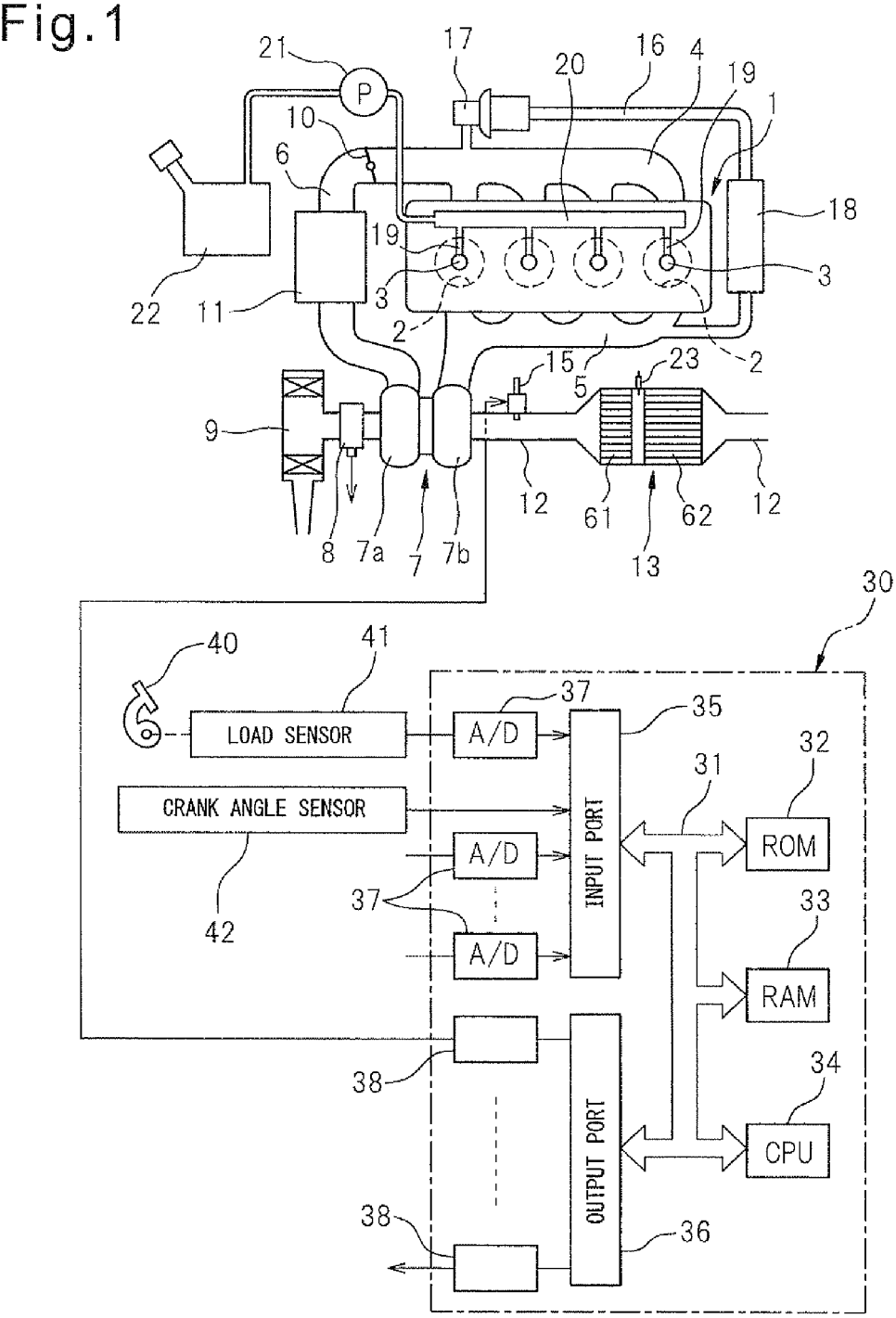
FIG. 1 is an overall view of a compression ignition type of an internal combustion engine in an embodiment.

FIG. 1 is an overall view of an internal combustion engine in the present embodiment. The internal combustion engine is provided with an engine body 1. Further, the internal combustion engine is provided with an exhaust purification system which purifies the exhaust. The engine body 1 includes combustion chambers 2 as cylinders, electronically controlled fuel injectors 3 for injecting fuel to the combustion chambers 2, an intake manifold 4, and an exhaust manifold 5.

The intake manifold 4 is connected through an intake duct 6 to an outlet of a compressor 7a of an exhaust turbocharger 7. An inlet of the compressor 7a is connected through an intake air detector 8 to an air cleaner 9. Inside the intake duct 6, a throttle valve 10 is arranged which is driven by a step motor. Furthermore, in the middle of the intake duct 6, a cooling device 11 is arranged for cooling the intake air which flows through the inside of the intake duct 6. In the embodiment which is shown in FIG. 1, engine cooling water is guided to the cooling device 11. The engine cooling water is used to cool the intake air.

On the other hand, the exhaust manifold 5 is connected to the inlet of the exhaust turbine 7b of the exhaust turbocharger 7. The exhaust purification system in the present embodiment is provided with an exhaust purification catalyst 13 which removes the $NO_X$ which is contained in the exhaust. The exhaust purification catalyst 13 causes the $NO_X$ and the hydrocarbons which are contained in the exhaust to react. The first exhaust purification catalyst 13 in the present embodiment includes an upstream side catalyst 61 and a downstream side catalyst 62. The upstream side catalyst 61 and the downstream side catalyst 62 are connected in series. The exhaust purification catalyst 13 is connected through an exhaust pipe 12 to an outlet of the exhaust turbine 7b.

Upstream of the exhaust purification catalyst 13, a hydrocarbon feed valve 15 is arranged for feeding hydrocarbons comprised of diesel oil which is used as the fuel of a compression ignition type internal combustion engine or other fuel. In the present embodiment, diesel oil is used as the hydrocarbons which are fed from the hydrocarbon feed valve 15. Note that, the present invention can also be applied to a spark ignition type of internal combustion engine in which the air-fuel ratio at the time of combustion is controlled to be lean. In this case, from the hydrocarbon feed valve, hydrocarbons comprised of gasoline which is used as the fuel of the spark ignition type of internal combustion engine or other fuel are fed.

Between the exhaust manifold 5 and the intake manifold 4, an EGR passage 16 is arranged for exhaust gas recirculation (EGR). In the EGR passage 16, an electronic control type of EGR control valve 17 is arranged. Further, in the middle of the EGR passage 16, a cooling device 18 is arranged for cooling the EGR gas which flows through the inside of the EGR passage 16. In the embodiment which is shown in FIG. 1, engine cooling water is guided to the inside of the cooling device 18. The engine cooling water is used to cool the EGR gas.

The respective fuel injectors 3 are connected through fuel feed tubes 19 to a common rail 20. The common rail 20 is connected through an electronic control type of variable discharge fuel pump 21 to a fuel tank 22. The fuel which is stored in the fuel tank 22 is fed by the fuel pump 21 to the inside of the common rail 20. The fuel which is fed to the common rail 20 is fed through the respective fuel feed tubes 19 to the fuel injectors 3.

An electronic control unit 30 in the present embodiment is comprised of a digital computer. The electronic control unit 30 in the present embodiment functions as a control device of the exhaust purification system. The electronic control unit 30 includes components which are connected to each other by a bidirectional bus 31 such as a ROM (read only memory) 32, RAM (random access memory) 33, CPU (microprocessor) 34, input port 35, and output port 36. The ROM 32 is a read only memory device. The ROM 32 stores in advance maps and other information which are required for control. The CPU 34 can perform any computations or judgment. The RAM 33 is a random access memory device. The RAM 33 can store operational history or other information or store results of computations.

Downstream of the upstream side catalyst 61, a temperature sensor 23 is attached for detecting the temperature of the upstream side catalyst 61. The output signals of the temperature sensor 23 and intake air detector 8 are input through respectively corresponding AD converters 37 to the input port 35.

Further, an accelerator pedal 40 has a load sensor 41 connected to it which generates an output voltage which is proportional to the amount of depression of the accelerator pedal 40. The output voltage of the load sensor 41 is input through a corresponding AD converter 37 to the input port 35. Furthermore, the input port 35 has connected to it a crank angle sensor 42 which generates an output pulse every time the crankshaft rotates by for example 15°. The output of the crank angle sensor 42 can be used to detect the crank angle or the engine speed. On the other hand, the output port 36 is connected through corresponding drive circuits 38 to the fuel injectors 3, step motor for driving the throttle valve 10, hydrocarbon feed valve 15, EGR control valve 17, and fuel pump 21. These fuel injectors 3, throttle valve 10, hydrocarbon feed valve 15, EGR control valve 17, etc. are controlled by the electronic control unit 30.

Figure 2A:
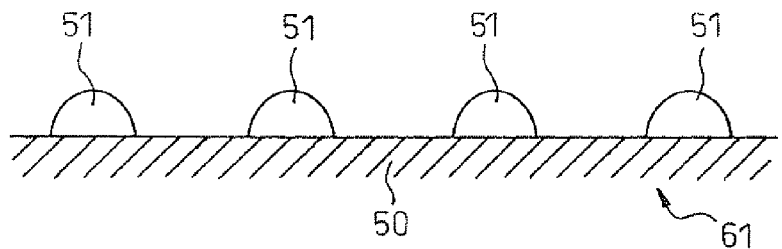
FIG. 2A is an enlarged schematic view of a surface part of a catalyst carrier in an upstream side catalyst.

FIG. 2A schematically shows a surface part of the catalyst carrier which is carried on the substrate of the upstream side catalyst of the exhaust purification catalyst. The upstream side catalyst 61 is comprised of a catalyst which has an oxidation ability. The upstream side catalyst 61 in the present embodiment is a so-called oxidation catalyst. At the upstream side catalyst 61, catalyst particles 51 are carried on the catalyst carrier 50 formed from alumina etc. The catalyst particles 51 can be formed from a precious metal or transition metal or other material which has a catalytic action which promotes oxidation. The catalyst particles 51 in the present embodiment are formed by platinum Pt.

Figure 2B:
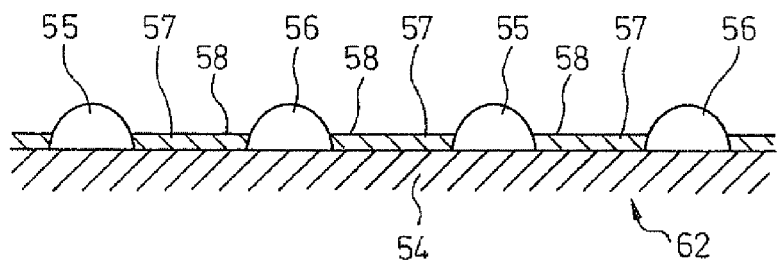
FIG. 2B is an enlarged schematic view of a surface part of a catalyst carrier in a downstream side catalyst.

FIG. 2B schematically shows a surface part of the catalyst carrier which is carried on the substrate of the downstream side catalyst. In the downstream side catalyst 62, precious metal catalyst particles 55, 56 are carried on a catalyst carrier 54 comprised of for example alumina. Furthermore, on the catalyst carrier 54, a basic layer 57 is formed which includes at least one element selected from potassium K, sodium Na, cesium Cs, or other such alkali metal, barium Ba, calcium Ca, or other such alkali earth metal, a lanthanide and other rare earths and silver Ag, copper Cu, iron Fe, iridium Ir, and other such metals able to donate electrons to $NO_X$. The exhaust flows along the catalyst carrier 54, so the catalyst particles 55, 56 can be said to be carried on the exhaust flow surface of the downstream side catalyst 62. Further, the surface of the basic layer 57 exhibits basicity, so the surface of the basic layer 57 is called a "basic exhaust flow surface part 58".

In FIG. 2B, the precious metal catalyst particles 55 are comprised of platinum Pt, while the precious metal catalyst particles 56 are comprised of rhodium Rh. That is, the catalyst particles 55, 56 which are carried on the catalyst carrier 54 are comprised of platinum Pt and rhodium Rh. Note that, the catalyst carrier 54 of the downstream side catalyst 62 can further carry palladium Pd in addition to platinum Pt and rhodium Rh or can carry palladium Pd instead of rhodium Rh. That is, the catalyst particles 55, 56 which are carried on the catalyst carrier 54 are comprised of platinum Pt and at least one of rhodium Rh and palladium Pd.

Figure 3:
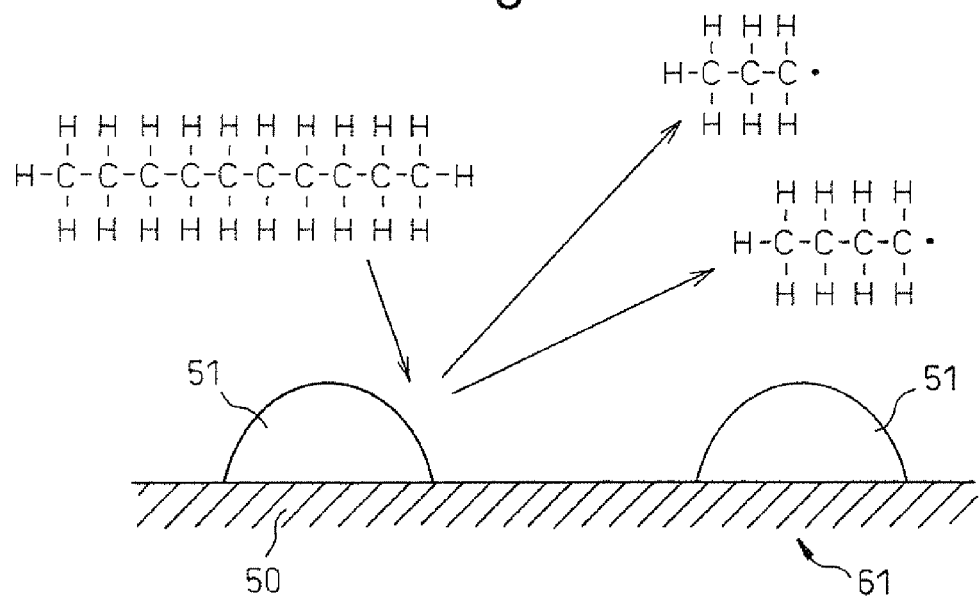
FIG. 3 is a view which explains an oxidation reaction of hydrocarbons in an upstream side catalyst.

FIG. 3 schematically shows a surface part of the catalyst carrier which is carried on the substrate of the upstream side catalyst of the exhaust purification catalyst. If hydrocarbons are injected from the hydrocarbon feed valve 15 into the exhaust, the hydrocarbons are reformed at the upstream side catalyst 61. That is, the hydrocarbons HC which are injected from the hydrocarbon feed valve 15 become radical hydrocarbons HC with few carbon atoms due to the catalytic action of the upstream side catalyst 61. In the present invention, the hydrocarbons which are reformed at this time are used to remove the $NO_X$ at the downstream side catalyst 62.

Further, even if injecting the fuel, that is, the hydrocarbons, from the fuel injectors 3 to the inside of the combustion chambers 2 in the second half of the expansion stroke or during the exhaust stroke, the hydrocarbons are reformed inside the combustion chambers 2 or at the upstream side catalyst 61, and the $NO_X$ which is contained in the exhaust is removed by the reformed hydrocarbons. Therefore, in the present invention, instead of feeding hydrocarbons from the hydrocarbon feed valve 15 to the inside of the engine exhaust passage, it is also possible to feed hydrocarbons to the insides of the combustion chambers 2 in the second half of the expansion stroke or during the exhaust stroke. In this way, in the present invention, it is possible to feed hydrocarbons into the combustion chambers 2, but below the case of injecting hydrocarbons from the hydrocarbon feed valve 15 to the inside of the engine exhaust passage will be used as an example for explaining the present invention.

Figure 4:
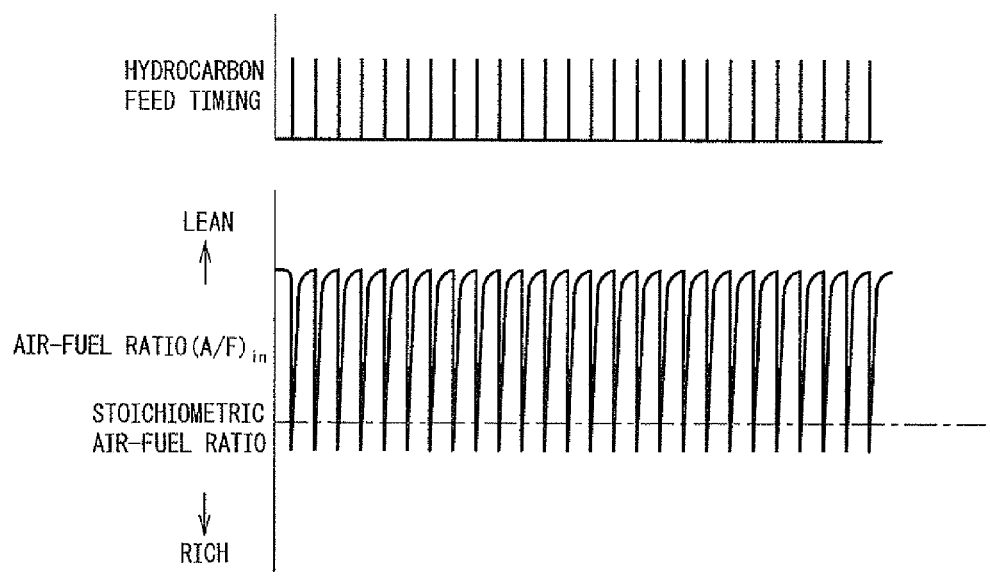
FIG. 4 is a view which shows changes in an air-fuel ratio of exhaust which flows into an exhaust purification catalyst in a first $NO_X$ removal method.

FIG. 4 shows the timing of feed of hydrocarbons from the hydrocarbon feed valve and the change in the air-fuel ratio (A/F)in of the exhaust which flows into the exhaust purification catalyst. Note that, the change of the air-fuel ratio (A/F)in depends on the change in the concentration of hydrocarbons in the exhaust which flows into the exhaust purification catalyst 13, so the change in the air-fuel ratio (A/F)in which is shown in FIG. 4 can be said to express the change in the concentration of hydrocarbons. However, if the concentration of hydrocarbons becomes higher, the air-fuel ratio (A/F)in becomes smaller. In FIG. 4, the richer the air-fuel ratio (A/F) in, the higher the concentration of hydrocarbons.

Figure 5:
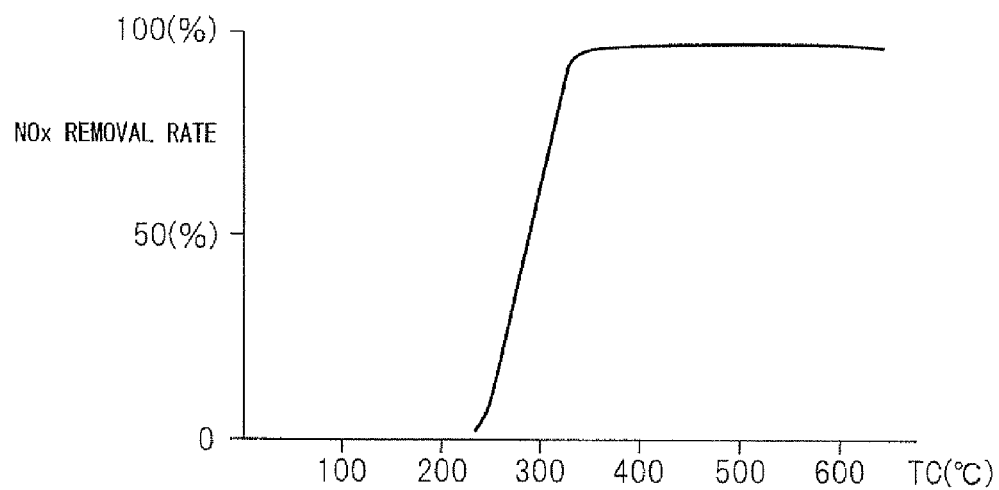
FIG. 5 is a view which shows an $NO_X$ removal rate of a first $NO_X$ removal method.

FIG. 5 shows the $NO_X$ removal rate by the exhaust purification catalyst 13 with respect to each catalyst temperature TC of the exhaust purification catalyst 13 when periodically changing the concentration of hydrocarbons which flow into the exhaust purification catalyst 13 so as to change the air-fuel ratio (A/F)in of the exhaust which flows into the exhaust purification catalyst 13 as shown in FIG. 4. The inventors engaged in extensive research on $NO_X$ removal over a long period of time and in the process of the research learned that if making the concentration of hydrocarbons which flow into the exhaust purification catalyst 13 "vibrate" by within a predetermined range of amplitude and by within a predetermined range of period, as shown in FIG. 5, an extremely high $NO_X$ removal rate is obtained even in the 400° C. or higher high temperature region.

Furthermore, at this time, they learned that a large amount of reducing intermediates containing nitrogen and hydrocarbons is produced in the exhaust purification catalyst 13 and these reducing intermediates play a central role in obtaining a high $NO_X$ removal rate.

Figure 6A:
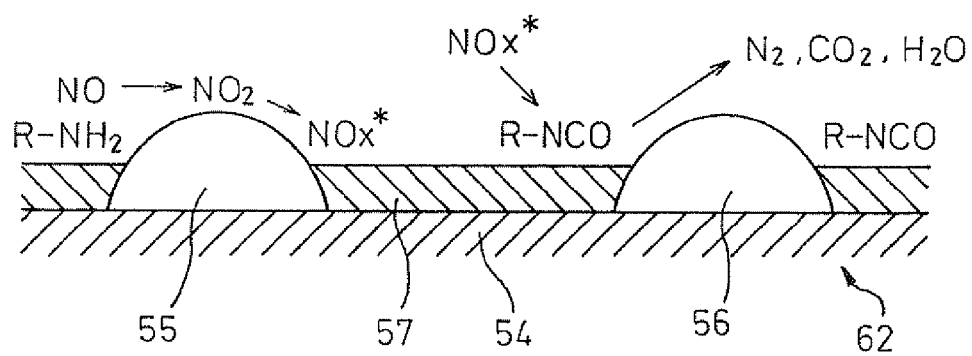
FIG. 6A is an enlarged schematic view which explains production of active $NO_X$ and reaction of reducing intermediates at a downstream side catalyst of the first $NO_X$ removal method.
Figure 6B:
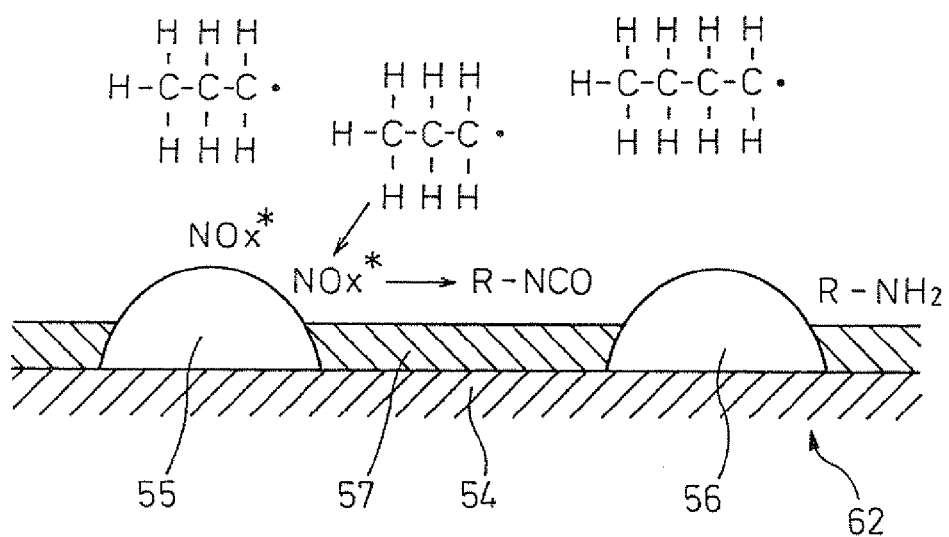
FIG. 6B is an enlarged schematic view which explains production of reducing intermediates in a downstream side catalyst of the first $NO_X$ removal method.

Next, this will be explained with reference to FIG. 6A and FIG. 6B. Note that, FIG. 6A and FIG. 6B schematically show surface parts of the catalyst carrier of the downstream side catalyst. FIG. 6A and FIG. 6B show the reaction which is presumed to occur when making the concentration of hydrocarbons which flow into the exhaust purification catalyst 13 vibrate by within a predetermined range of amplitude and by within a predetermined range of period.

FIG. 6A shows when the concentration of hydrocarbons which flows into the exhaust purification catalyst is low. As will be understood from FIG. 4, the air-fuel ratio of the exhaust which flows into the exhaust purification catalyst 13 is maintained lean except for an instant, so the exhaust which flows into the downstream side catalyst 62 usually becomes an excess of oxygen. Therefore, the NO which is contained in the exhaust is oxidized on the catalyst particles 55 and becomes $NO_2$, then this $NO_2$ is further oxidized and becomes $NO_3$. Further, part of the $NO_2$ becomes $NO_2^-$. In this case, the amount of production of $NO_3$ is far greater than the amount of production of $NO_2^-$. Therefore, on the catalyst particles 55, a large amount of $NO_3$ and a small amount of $NO_2^-$ are produced. These $NO_3$ and $NO_2^-$ are strong in activity. Below, these $NO_3$ and $NO_2^-$ will be called "active $NO_X^*$". These active $NO_X^*$ are held by deposition or adsorption on the surface of the basic layer 57.

Next, when hydrocarbons are fed from the hydrocarbon feed valve 15, as shown in FIG. 3, at the upstream side catalyst 61, the hydrocarbons which are contained in the exhaust are partially oxidized. The hydrocarbons are reformed inside the upstream side catalyst 61 to become radical in state. The reformed hydrocarbons are fed to the downstream side catalyst 62.

FIG. 6B shows when hydrocarbons are fed from the hydrocarbon feed valve and the concentration of hydrocarbons which flow into the exhaust purification catalyst becomes higher. If the concentration of hydrocarbons which flow into the downstream side catalyst 62 becomes higher, the concentration of hydrocarbons around the active $NO_X^*$ becomes higher. If the concentration of hydrocarbons around the active $NO_X^*$ becomes higher, the active $NO_X^*$ reacts with the radical hydrocarbons HC on the catalyst particles 55 whereby reducing intermediates are produced.

Note that, the reducing intermediate which is first produced at this time is believed to be the nitro compound R—$NO_2$. This nitro compound R—$NO_2$ becomes the nitrile compound R—CN when produced, but this nitrile compound R—CN can only survive in that state for an instant, so immediately becomes the isocyanate compound R—NCO. This isocyanate compound R—NCO becomes the amine compound R—$NH_2$ if hydrolyzed. However, in this case, what is hydrolyzed is believed to be part of the isocyanate compound R—NCO. Therefore, as shown in FIG. 6B, the majority of the reducing intermediates which is produced is believed to be the isocyanate compound R—NCO and amine compound R—$NH_2$. The large amount of reducing intermediates which are produced inside of the downstream side catalyst 62 are deposited or adsorbed on the surface of the basic layer 57.

Next, as shown in FIG. 6A, if the concentration of hydrocarbons which flow into the exhaust purification catalyst 13 becomes lower, at the downstream side catalyst 62, the active $NO_X^*$ and the produced reducing intermediates react. In this regard, after the active $NO_X^*$ is held on the surface of the basic layer 57 in this way or after the active $NO_X^*$ is produced, if the state of a high concentration of oxygen around the active $NO_X^*$ continues for a certain time period or more, the active $NO_X^*$ is oxidized and is absorbed inside the basic layer 57 in the form of nitric acid ions $NO_3^-$. However, if the reducing intermediates are produced before this certain time period elapses, as shown in FIG. 6A, the active $NO_X^*$ reacts with the reducing intermediates R—NCO or R—$NH_2$ to become $N_2$, $CO_2$, or $H_2O$ and therefore the $NO_X^*$ is removed. Note that, in this case, it is necessary to hold a sufficient amount of reducing intermediates R—NCO or R—$NH_2$ on the surface of the basic layer 57, that is, on the basic exhaust flow surface part 58, until the produced reducing intermediates react with the active $NO_X^*$. The basic exhaust flow surface parts 58 are provided for this reason.

In this way, the concentration of hydrocarbons which flow into the exhaust purification catalyst 13 is temporarily made high to produce reducing intermediates and the produced reducing intermediates are made to react with the active $NO_X$ to remove the $NO_X$. That is, to use the exhaust purification catalyst 13 to remove the $NO_X$, it is necessary to periodically change the concentration of hydrocarbons which flow into the exhaust purification catalyst 13.

Of course, in this case, it is necessary to raise the concentration of hydrocarbons to a concentration sufficiently high for producing the reducing intermediates. That is, it is necessary to make the concentration of hydrocarbons which flow into the exhaust purification catalyst 13 vibrate by within a predetermined range of amplitude.

On the other hand, if lengthening the feed period of hydrocarbons, the time period during which the concentration of oxygen becomes higher in the interval after hydrocarbons are fed to when hydrocarbons are next fed becomes longer and therefore the active $NO_X$ is absorbed inside the basic layer 57 in the form of nitrates without producing reducing intermediates. To avoid this, it is necessary to make the concentration of hydrocarbons which flow into the exhaust purification catalyst 13 vibrate by within a predetermined range of period. Incidentally, in the example which is shown in FIG. 4, the injection interval is made 3 seconds.

Figure 7A:
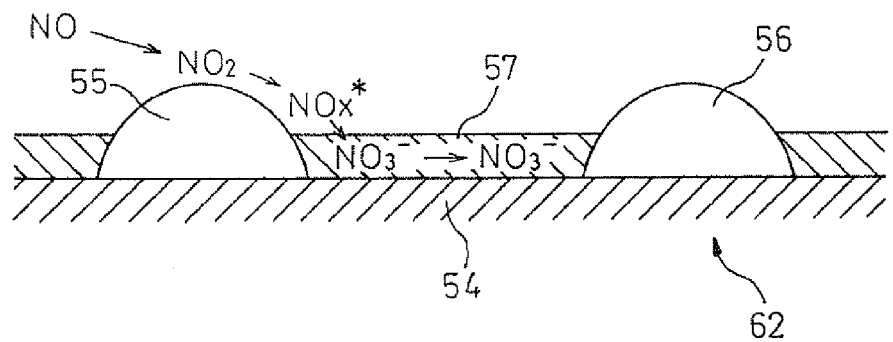
FIG. 7A is an enlarged schematic view which explains storage of $NO_X$ in a downstream side catalyst of a second $NO_X$ removal method.

As explained above, if making the vibration period of the concentration of hydrocarbons, that is, the period of feed of hydrocarbons HC, longer than a predetermined range of period, at the downstream side catalyst 62, the active $NO_X$ diffuses in the basic layer 57 in the form of nitric acid ions $NO_3^-$ as shown in FIG. 7A and becomes nitrates. That is, at this time, the $NO_X$ in the exhaust is absorbed inside the basic layer 57 in the form of nitrates.

Figure 7B:
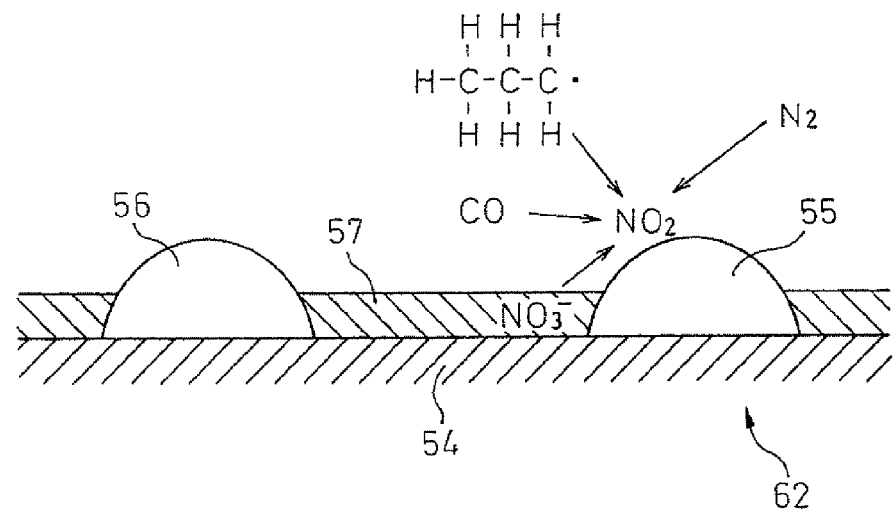
FIG. 7B is an enlarged schematic view which explains release and reduction of $NO_X$ in a downstream side catalyst of the second $NO_X$ removal method.

On the other hand, FIG. 7B shows the case where when, in this way, $NO_X$ is absorbed in the basic layer 57 in the form of nitrates, the air-fuel ratio of the exhaust which flows into the exhaust purification catalyst 13 is made the stoichiometric air-fuel ratio or rich. In this case, the concentration of oxygen in the exhaust falls, so the reaction proceeds in the opposite direction ($NO_3^- \rightarrow NO_2$) and therefore the nitrates which are absorbed inside the basic layer 57 successively become nitric acid ions $NO_3^-$ and, as shown in FIG. 7B, are released in the form of $NO_2$ from the basic layer 57. Next, the released $NO_2$ is reduced by the hydrocarbons HC and CO which are contained in the exhaust.

Figure 8:
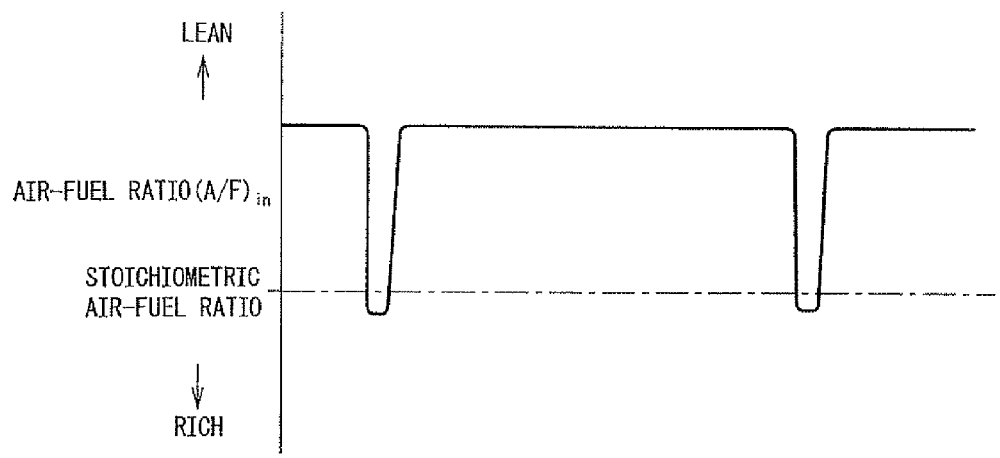
FIG. 8 is a view which shows changes in an air-fuel ratio of exhaust which flows into a downstream side catalyst of the second $NO_X$ removal method.

FIG. 8 shows the case of making the air-fuel ratio (A/F)in of the exhaust which flows into the exhaust purification catalyst 13 temporarily rich slightly before the $NO_X$ absorption ability of the basic layer 57 becomes saturated. Note that, in the example which is shown in FIG. 8, the time interval of this rich control is 1 minute or more. In this case, the $NO_X$ which was absorbed inside the basic layer 57 when the air-fuel ratio (A/F)in of the exhaust is lean is released all at once from the basic layer 57 and reduced when the air-fuel ratio (A/F)in of the exhaust is made temporarily rich. Therefore, in this case, the basic layer 57 performs the role of an absorbent for temporarily absorbing the $NO_X$. Note that, at this time, sometimes the basic layer 57 temporarily adsorbs the $NO_X$. Therefore, if using the term "storage" as a term including both absorption and adsorption, at this time the basic layer 57 performs the role of an $NO_X$ storage agent for temporarily storing the $NO_X$. That is, in this case, if referring to the ratio of the air and fuel (hydrocarbons) which are fed into the engine intake passage, combustion chambers 2, and exhaust passage upstream of the upstream side catalyst 61 as the "air-fuel ratio of the exhaust", the downstream side catalyst 62 functions as an $NO_X$ storage catalyst which stores the $NO_X$ when the air-fuel ratio of the exhaust is lean and releases the stored $NO_X$ when the concentration of oxygen in the exhaust falls.

Figure 9:
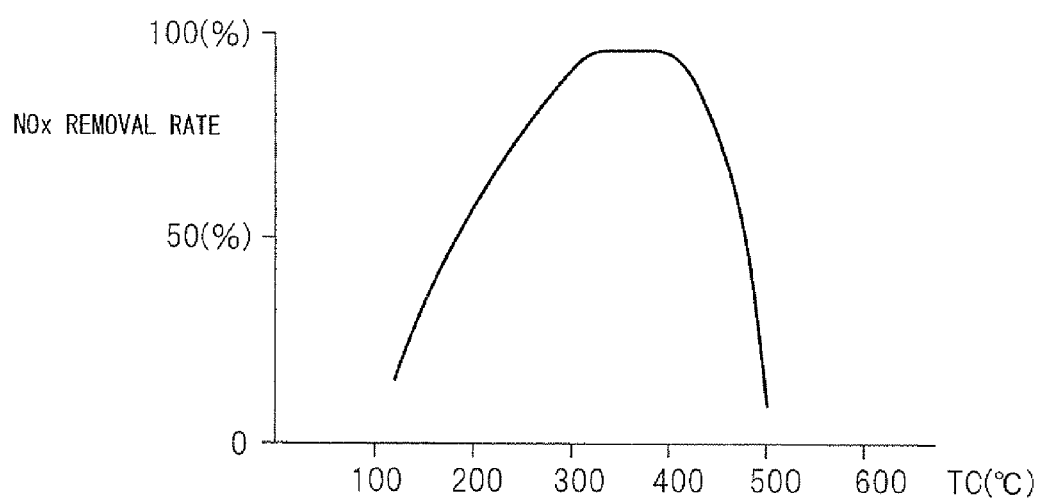
FIG. 9 is a view which shows an $NO_X$ removal rate in the second $NO_X$ removal method.

FIG. 9 shows the $NO_X$ removal rate when making the exhaust purification catalyst function as an $NO_X$ storage catalyst in this way. Note that, the abscissa of FIG. 9 indicates the catalyst temperature TC of the downstream side catalyst 62. When making the exhaust purification catalyst 13 function as an $NO_X$ storage catalyst, as shown in FIG. 9, when the temperature TC of the downstream side catalyst 62 is from 300° C. to 400° C., an extremely high $NO_X$ removal rate is obtained, but if the catalyst temperature TC becomes a 400° C. or more high temperature, the $NO_X$ removal rate falls.

In this way, the $NO_X$ removal rate falls if the catalyst temperature TC becomes 400° C. or more because if the catalyst temperature TC becomes 400° C. or more, nitrates break down by heat and are released in the form of $NO_2$ from the downstream side catalyst 62. That is, so long as storing $NO_X$ in the form of nitrates, when the catalyst temperature TC is high, a high $NO_X$ removal rate is hard to obtain. However, in the new $NO_X$ removal method which is shown from FIG. 4 to FIG. 6A and FIG. 6B, as will be understood from FIG. 6A and FIG. 6B, nitrates are not produced or even if produced are extremely small in amount. Therefore, as shown in FIG. 5, even when the catalyst temperature TC is high, a high $NO_X$ removal rate is obtained.

In this way, the exhaust purification system of the present embodiment has the property of reducing the $NO_X$ which is contained in the exhaust if making the concentration of hydrocarbons which flow into the exhaust purification catalyst 13 vibrate by within a predetermined range of amplitude and by within a predetermined range of period. Further, the exhaust purification system of the present embodiment has the property of the amount of storage of $NO_X$ which is contained in the exhaust increasing if making the vibration period of the concentration of hydrocarbons which flow into the exhaust purification catalyst 13 longer than a predetermined range.

The $NO_X$ removal method which is shown from FIG. 4 to FIG. 6A and FIG. 6B can be said to be a new $NO_X$ removal method designed to remove the $NO_X$ without forming almost any nitrates when using a catalyst which carries precious metal catalyst particles and forms a basic layer which can absorb the $NO_X$. In actuality, when using this new $NO_X$ removal method, the amount of nitrates which are detected from the basic layer 57 becomes extremely small compared to when making the exhaust purification catalyst 13 function as an $NO_X$ storage catalyst. Note that, this new $NO_X$ removal method will be referred to below as the "first $NO_X$ removal method". The internal combustion engine in the present embodiment is formed to remove $NO_X$ by the first $NO_X$ removal method by making the concentration of hydrocarbons which flow into the exhaust purification catalyst 13 vibrate by within a predetermined range of amplitude and by within a predetermined range of period.

Next, this first $NO_X$ removal method will be explained in a bit more detail while referring to FIG. 10 to FIG. 15.

Figure 10:
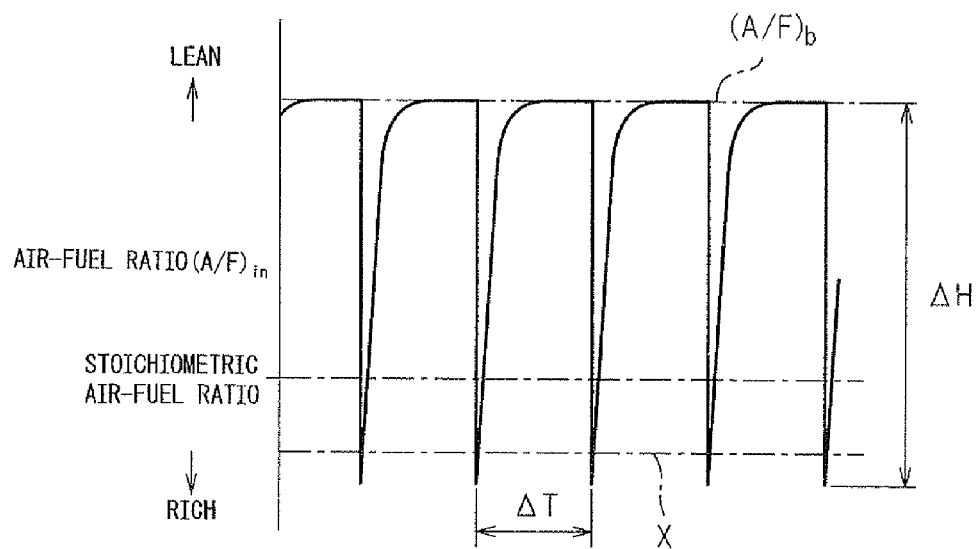
FIG. 10 is a view which shows changes in an air-fuel ratio of exhaust which flows into an exhaust purification catalyst in the first $NO_X$ removal method.

FIG. 10 shows the change in the air-fuel ratio (A/F)in which is shown in FIG. 4 enlarged. Note that, as explained above, the change in the air-fuel ratio (A/F)in of the exhaust which flows into the exhaust purification catalyst 13 simultaneously shows the change in the concentration of hydrocarbons which flow into the exhaust purification catalyst 13. Note that, in FIG. 10, ΔH shows the amplitude of the change in concentration of the hydrocarbons HC which flow into the exhaust purification catalyst 13, while ΔT shows the vibration period of the concentration of hydrocarbons which flow into the exhaust purification catalyst 13.

Furthermore, in FIG. 10, (A/F)b expresses the base air-fuel ratio which shows the air-fuel ratio of the combustion gas for generating the engine output. In other words, this base air-fuel ratio (A/F)b expresses the air-fuel ratio of the exhaust which flows into the exhaust purification catalyst 13 when stopping the feed of hydrocarbons. On the other hand, in FIG. 10, X shows the upper limit of the air-fuel ratio (A/F)in which enables production of a sufficient amount of reducing intermediates from the active $NO_X$ and reformed hydrocarbons and enables reaction of the active $NO_X$ with the reducing intermediates without causing it to be stored in the form of nitrates in the basic layer 57. To cause production of a sufficient amount of reducing intermediates from the active $NO_X$ and reformed hydrocarbons and cause reaction of the active $NO_X$ with the reducing intermediates without causing it to be stored in the form of nitrates in the basic layer 57, it is necessary to make the air-fuel ratio (A/F)in lower than the upper limit X of the air-fuel ratio.

In other words, X of FIG. 10 expresses the lower limit of the concentration of hydrocarbons which is necessary for production of a sufficient amount of reducing intermediates and reacting the active $NO_X$ with the reducing intermediates. To cause production of a sufficient amount of reducing intermediates and cause reaction of the active $NO_X$ with the reducing intermediates, it is necessary to raise the concentration of hydrocarbons to above this lower limit X as well. In this case, whether a sufficient amount of reducing intermediates is produced and the active $NO_X$ reacts with the reducing intermediates is determined by the ratio between concentration of oxygen around the active $NO_X$ and the concentration of hydrocarbons, that is, the air-fuel ratio (A/F)in. The above-mentioned upper limit X of the air-fuel ratio which is necessary for causing production of a sufficient amount of reducing intermediates and causing the active $NO_X$ to react with the reducing intermediates will be referred to below as the "demanded minimum air-fuel ratio".

Figure 11:
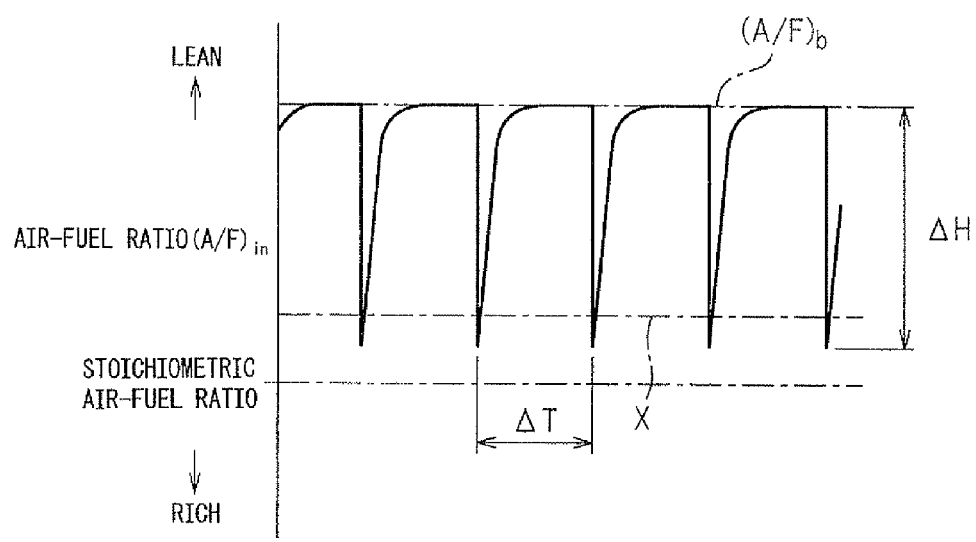
FIG. 11 is another time chart which shows changes in the air-fuel ratio of exhaust which flows into an exhaust purification catalyst in the first $NO_X$ removal method.

In the example which is shown in FIG. 10, the demanded minimum air-fuel ratio X becomes rich. Therefore, in this case, to cause production of a sufficient amount of reducing intermediates and make the active $NO_X$ react with the reducing intermediates, the air-fuel ratio (A/F)in is instantaneously made the demanded minimum air-fuel ratio X or less, that is, rich. As opposed to this, in the example which is shown in FIG. 11, the demanded minimum air-fuel ratio X is lean. In this case, the air-fuel ratio (A/F)in is maintained lean while periodically lowering the air-fuel ratio (A/F)in so as to produce a sufficient amount of reducing intermediates and react the active $NO_X$ with the reducing intermediates.

In this case, whether the demanded minimum air-fuel ratio X becomes rich or lean depends on the oxidizing power of the upstream side catalyst 61. In this case, the upstream side catalyst 61 for example becomes stronger in oxidizing power if increasing the amount of precious metal carried and becomes stronger in oxidizing power if strengthening the acidity. Therefore, the oxidizing power of the upstream side catalyst 61 changes depending on the amount of the precious metal carried or the strength of the acidity.

Now, when using an upstream side catalyst 61 with a strong oxidizing power, as shown in FIG. 11, if maintaining the air-fuel ratio (A/F)in lean while periodically lowering the air-fuel ratio (A/F)in, when the air-fuel ratio (A/F)in is lowered, the hydrocarbons end up being completely oxidized and as a result the reducing intermediates can no longer be produced. As opposed to this, when using an upstream side catalyst 61 with a strong oxidizing power, as shown in FIG. 10, if periodically making the air-fuel ratio (A/F)in rich, the hydrocarbons are partially oxidized without being completely oxidized when the air-fuel ratio (A/F)in is made rich, that is, the hydrocarbons are reformed, and therefore a sufficient amount of reducing intermediates is produced and the active $NO_X$ is made to react with the reducing intermediates. Therefore, when using an upstream side catalyst 61 with a strong oxidizing power, the demanded minimum air-fuel ratio X has to be made rich.

On the other hand, when using an upstream side catalyst 61 with a weak oxidizing power, as shown in FIG. 11, if maintaining the air-fuel ratio (A/F)in lean while periodically lowering the air-fuel ratio (A/F)in, the hydrocarbons are partially oxidized without being completely oxidized, that is, the hydrocarbons are reformed, and therefore a sufficient amount of reducing intermediates is produced and the active $NO_X$ is made to react with the reducing intermediates. As opposed to this, if using an upstream side catalyst 61 with a weak oxidizing power, as shown in FIG. 10, if making the air-fuel ratio (A/F)in periodically rich, a large amount of hydrocarbons is simply exhausted from the upstream side catalyst 61 without being oxidized and therefore the amount of hydrocarbons which is wastefully consumed increases. Therefore, when using an upstream side catalyst 61 with a weak oxidizing power, the demanded minimum air-fuel ratio X must be made lean.

Figure 12:
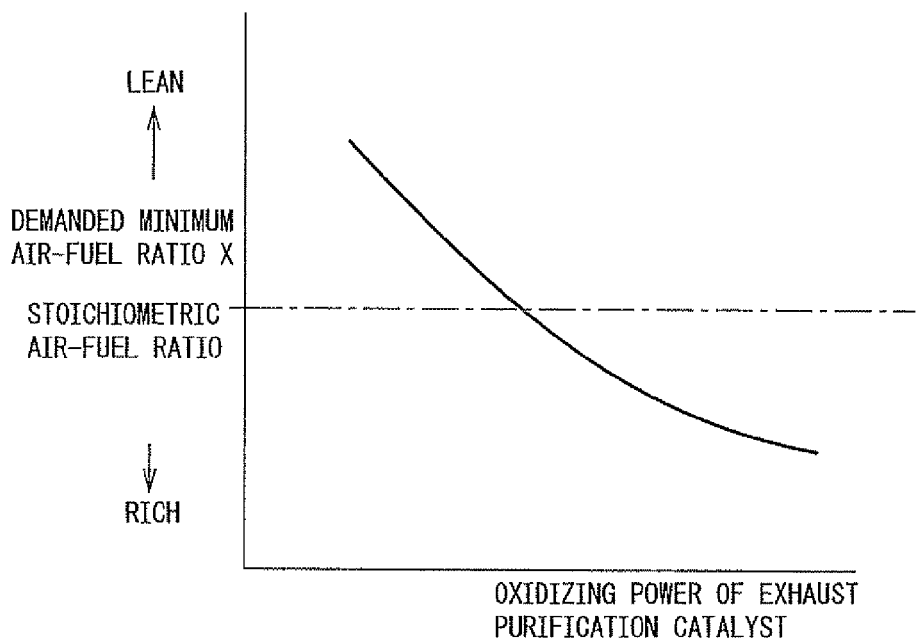
FIG. 12 is a view which shows the relationship between the oxidizing power of an exhaust purification catalyst and a demanded minimum air-fuel ratio X in the first $NO_X$ removal method.

That is, it is learned that the demanded minimum air-fuel ratio X, as shown in FIG. 12, has to be lowered the stronger the oxidizing power of the upstream side catalyst 61. In this way, the demanded minimum air-fuel ratio X is made lean or rich by the oxidizing power of the upstream side catalyst 61, but below the case where the demanded minimum air-fuel ratio X is rich will be used as an example to explain the amplitude of the change in the concentration of hydrocarbons which flow into the exhaust purification catalyst 13 or the vibration period of the concentration of hydrocarbons which flow into the exhaust purification catalyst 13.

Now then, if the base air-fuel ratio (A/F)b becomes larger, that is, if the concentration of oxygen in the exhaust before the hydrocarbons are fed becomes higher, the amount of feed of hydrocarbons required for making the air-fuel ratio (A/F)in the demanded minimum air-fuel ratio X or less increases. Therefore, the higher the concentration of oxygen in the exhaust before hydrocarbons are fed, the larger the amplitude of the concentration of hydrocarbons has to be made.

Figure 13:
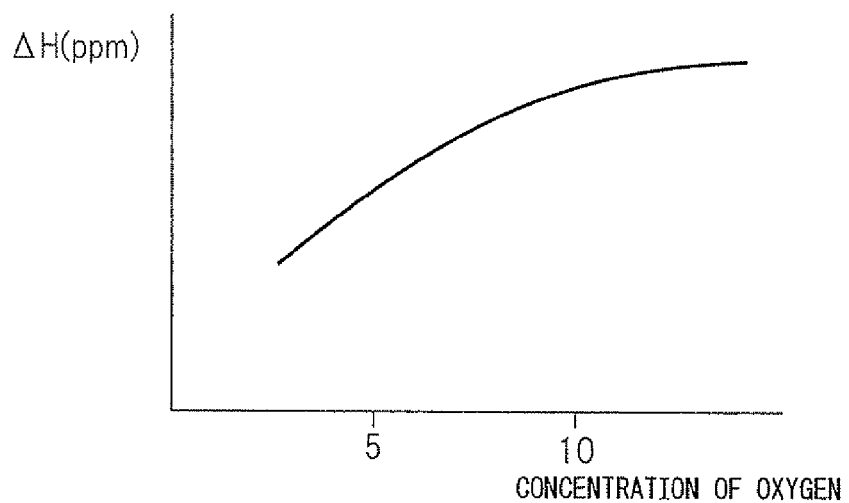
FIG. 13 is a view which shows the relationship between a concentration of oxygen in exhaust and an amplitude $\Delta H$ of the concentration of hydrocarbons which gives the same $NO_X$ removal rate in the first $NO_X$ removal method.

FIG. 13 shows the relationship between the concentration of oxygen in the exhaust before hydrocarbons are fed and the amplitude ΔH of the concentration of hydrocarbons when the same $NO_X$ removal rate is obtained. From FIG. 13, it is learned that to obtain the same $NO_X$ removal rate, the higher the concentration of oxygen in the exhaust before hydrocarbons are fed, the more the amplitude ΔH of the concentration of hydrocarbons has to be increased. That is, to obtain the same $NO_X$ removal rate, the higher the base air-fuel ratio (A/F)b, the more the amplitude ΔH of the concentration of hydrocarbons has to be increased. In other words, to remove the $NO_X$ well, it is possible to reduce the amplitude ΔH of the concentration of hydrocarbons the lower the base air-fuel ratio (A/F)b becomes.

Figure 14:
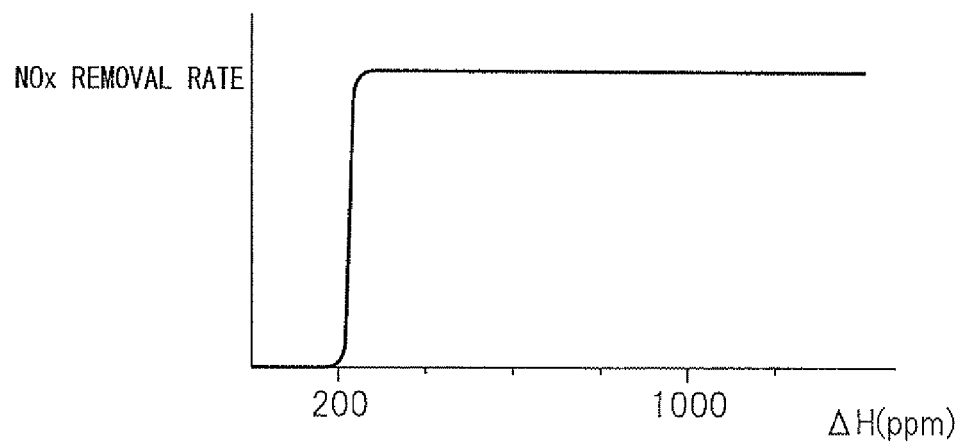
FIG. 14 is a view which shows the relationship between an amplitude $\Delta H$ of the concentration of hydrocarbons and an $NO_X$ removal rate in the first $NO_X$ removal method.

In this regard, the base air-fuel ratio (A/F)b becomes the lowest at the time of acceleration operation. At this time, if the amplitude ΔH of the concentration of hydrocarbons is 200 ppm or so, $NO_X$ can be removed well. The base air-fuel ratio (A/F)b usually becomes larger than the time of acceleration operation. Therefore, as shown in FIG. 14, a good $NO_X$ removal rate can be obtained if the amplitude ΔH of the concentration of hydrocarbon is 200 ppm or more.

On the other hand, it is learned that when the base air-fuel ratio (A/F)b is the highest, if making the amplitude ΔH of the concentration of hydrocarbons 10000 ppm or so, a good $NO_X$ removal rate can be obtained. Therefore, in the present invention, the predetermined range of amplitude of the concentration of hydrocarbons is made 200 ppm to 10000 ppm.

Figure 15:
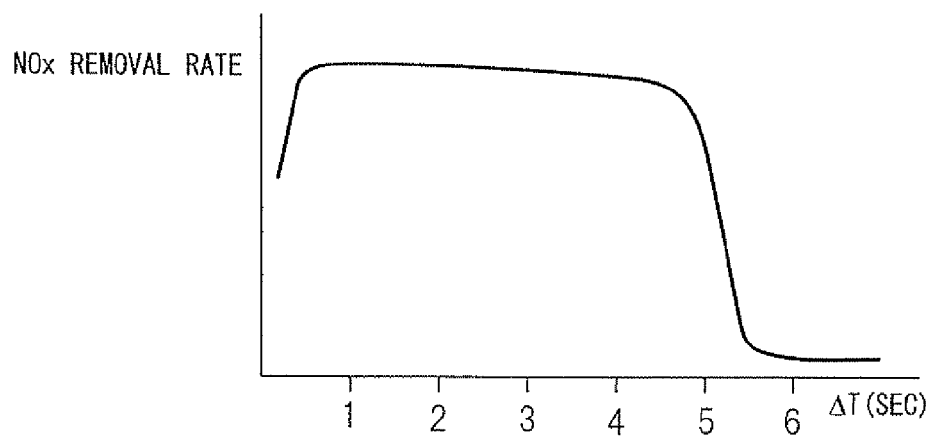
FIG. 15 is a view which shows the relationship between a vibration period $\Delta T$ of the concentration of hydrocarbons and an $NO_X$ removal rate in the first $NO_X$ removal method.

Further, if the vibration period $\Delta T$ of the concentration of hydrocarbons becomes longer, the concentration of oxygen around the active $NO_X$ becomes higher in the interval after hydrocarbons are fed to when hydrocarbons are next fed. In this case, if the vibration period $\Delta T$ of the concentration of hydrocarbons becomes longer than 5 seconds or so, the active $NO_X$ starts to be absorbed inside the basic layer 57 in the form of nitrates. Therefore, as shown in FIG. 15, if the vibration period $\Delta T$ of the concentration of hydrocarbons becomes longer than 5 seconds or so, the $NO_X$ removal rate falls. Therefore, the vibration period $\Delta T$ of the concentration of hydrocarbons has to be made 5 seconds or less.

On the other hand, if the vibration period $\Delta T$ of the concentration of hydrocarbons becomes about 0.3 second or less, the fed hydrocarbons start to build up on the exhaust purification catalyst 13. Therefore, as shown in FIG. 15, if the vibration period $\Delta T$ of the concentration of hydrocarbons becomes about 0.3 second or less, the $NO_X$ removal rate falls. Therefore, in the present invention, the vibration period of the concentration of hydrocarbons is made an interval of 0.3 second to 5 seconds.

Figure 16:
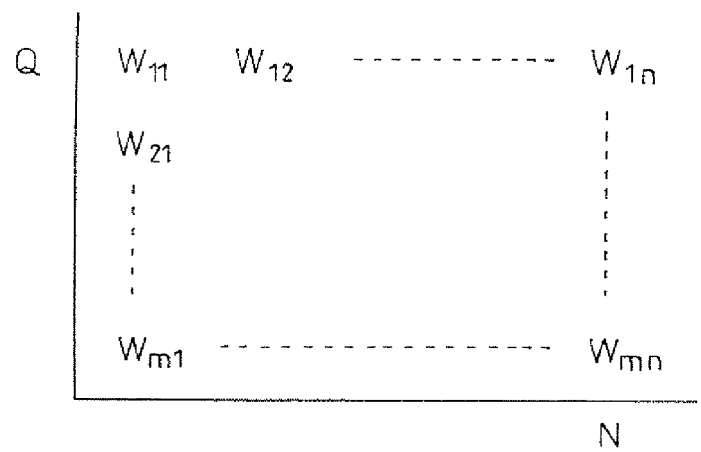
FIG. 16 is a view which shows a map of a hydrocarbon feed amount W in the first $NO_X$ removal method.

Now, in the present invention, control is performed to change the amount of feed of hydrocarbons and injection timing from the hydrocarbon feed valve 15 so that the amplitude $\Delta H$ of the concentration of hydrocarbons and the vibration period $\Delta T$ become the optimum values corresponding to the operating state of the engine. In this case, in an embodiment of the present invention, the amount of feed W of hydrocarbons which can give the optimum amplitude $\Delta H$ of the concentration of hydrocarbons is stored in advance inside the ROM 32 as a function of the amount of injection Q from the fuel injectors 3 and the engine speed N in the form of a map as shown in FIG. 16. Further, the optimum vibration amplitude $\Delta T$ of the concentration of hydrocarbons, that is, injection period $\Delta T$ of hydrocarbons, is similarly stored as a function of the amount of injection Q and engine speed N in the form of a map in the ROM 32.

Next, referring to FIG. 17 to FIG. 20, the method of removal of $NO_X$ when making the exhaust purification catalyst 13 function as an $NO_X$ storage catalyst will be explained in detail. The method of $NO_X$ removal when making the exhaust purification catalyst 13 function as an $NO_X$ storage catalyst in this way will be referred to below as the "second $NO_X$ removal method".

Figure 17:
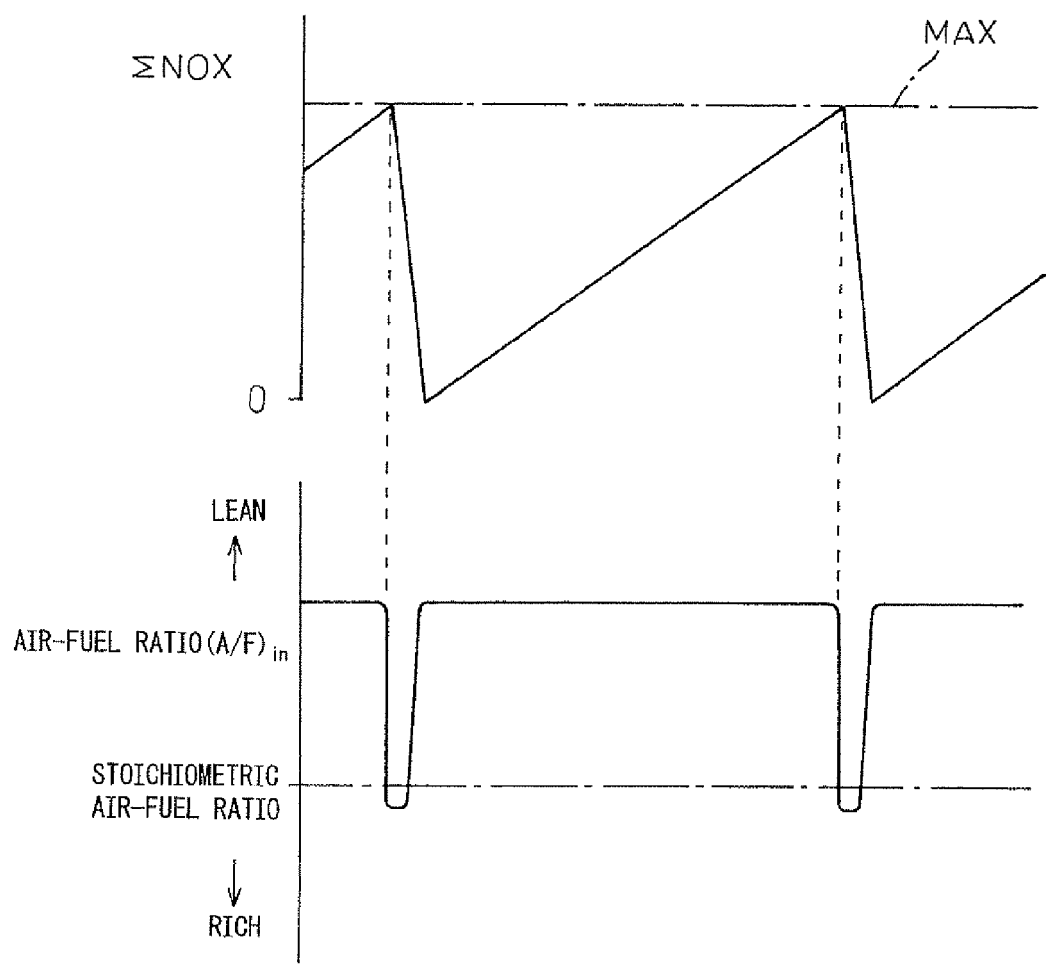
FIG. 17 is a view which shows an amount of $NO_X$ which is stored in the exhaust purification catalyst and a change of the air-fuel ratio of exhaust which flows into the exhaust purification catalyst in the second $NO_X$ removal method.

In this second $NO_X$ removal method, as shown in FIG. 17, when the stored $NO_X$ amount $\Sigma NOX$ which is stored in the basic layer 57 exceeds a predetermined allowable amount MAX, the air-fuel ratio (A/F)in of the exhaust which flows into the exhaust purification catalyst 13 is temporarily made rich. If the air-fuel ratio (A/F)in of the exhaust is made rich, the $NO_X$ which was stored in the basic layer 57 when the air-fuel ratio (A/F)in of the exhaust was lean is released all at once from the basic layer 57 and reduced. Due to this, the $NO_X$ is removed.

Figure 18:
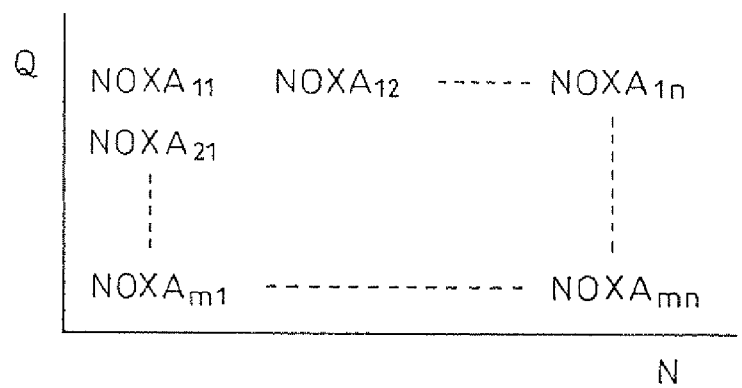
FIG. 18 is a view which shows a map of an $NO_X$ amount NOXA which is exhausted from an engine body.

The stored $NO_X$ amount $\Sigma NOX$, for example, is calculated from the amount of $NO_X$ which is exhausted from the engine. In an embodiment according to the present invention, the exhausted $NO_X$ amount NOXA which is exhausted from the engine per unit time is stored as a function of the amount of injection Q and engine speed N in the form of the map such as shown in FIG. 18 in advance in the ROM 32. The stored $NO_X$ amount $\Sigma NOX$ is calculated from this exhausted $NO_X$ amount NOXA. In this case, as explained above, the period during which the air-fuel ratio (A/F)in of the exhaust is made rich is usually 1 minute or more.

Figure 19:
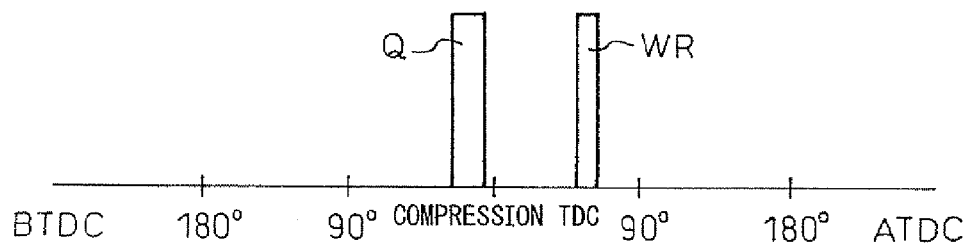
FIG. 19 is a view which shows a fuel injection timing in a combustion chamber in the second $NO_X$ removal method.
Figure 20:
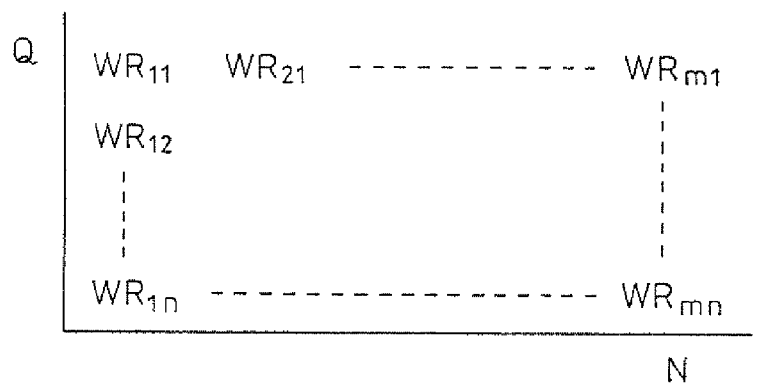
FIG. 20 is a view which shows a map of a hydrocarbon feed amount WR in the second $NO_X$ removal method.

In this second $NO_X$ removal method, as shown in FIG. 19, by performing auxiliary injection which injects additional fuel WR in addition to the main injection which injects combustion use fuel Q into the combustion chambers 2 from the fuel injectors 3, the air-fuel ratio (A/F)in of the exhaust which flows into the exhaust purification catalyst 13 is made rich. Note that, the abscissa shows the crank angle. In the example which is shown in FIG. 19, fuel WR is injected at a timing where it burns, but does not become engine output, that is, slightly before ATDC90° after top dead center of compression. This amount of fuel WR is stored as a function of the amount of injection Q and engine speed N in the form of the map such as shown in FIG. 20 in advance in the ROM 32. Of course, in this case, it is possible to increase the amount of feed of hydrocarbons from the hydrocarbon feed valve 15 so as to make the air-fuel ratio (A/F)in of the exhaust rich.

In this regard, the exhaust purification system of an internal combustion engine in the present embodiment is provided with a temperature control device which adjusts the temperature of the upstream side catalyst 61. The temperature control device in the present embodiment includes an electric heater. In the present embodiment, the substrate of the upstream side catalyst 61 functions as an electric heater. That is, the upstream side catalyst 61 in the present embodiment is comprised of an electric heating catalyst.

Figure 21A:
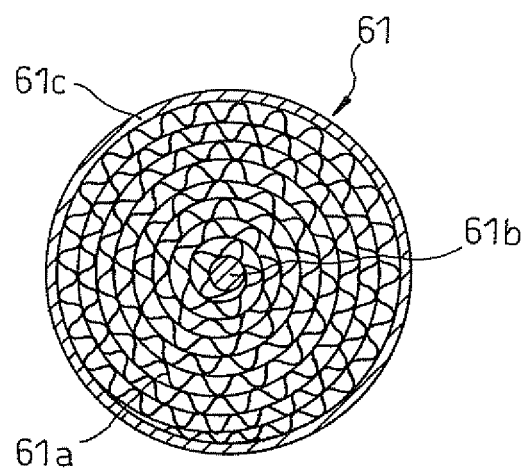
FIG. 21A is a schematic front view of an upstream side catalyst of a first exhaust purification catalyst in an embodiment.
Figure 21B:
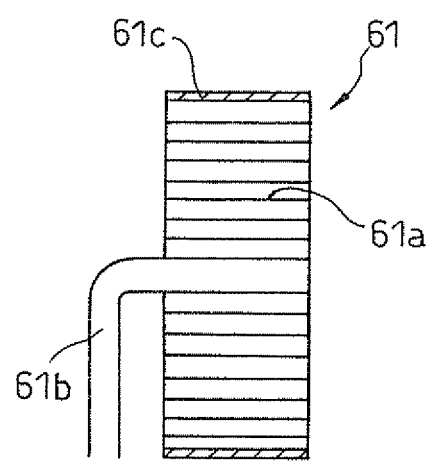
FIG. 21B is a schematic cross-sectional view of an upstream side catalyst of a first exhaust purification catalyst in an embodiment.

FIG. 21A shows a schematic front view of an upstream side catalyst of the first exhaust purification catalyst in the present embodiment. FIG. 21B shows a schematic cross-sectional view of an upstream side catalyst of the first exhaust purification catalyst in the present embodiment. The upstream side catalyst 61 includes a substrate 61a for carrying the catalyst particles and an outer tube 61c which is arranged around the substrate 61a and is formed so as to hold the substrate 61a. The substrate 61a includes cylindrically shaped plate members which are arranged concentrically and wave-shaped plate members which are arranged between these cylindrically shaped plate members. Between these plate-shaped members, exhaust channels are formed. At the wall surfaces of these exhaust channels, a catalyst carrier and catalyst particles are arranged.

At the approximate center of the substrate 61a, a center electrode 61b is arranged. The upstream side catalyst 61 in the present embodiment is comprised so that the substrate 61a becomes a resistor. The temperature control device is formed to apply voltage between the center electrode 61b and the outer tube 61c. By applying voltage between the center electrode 61b and the outer tube 61c, the substrate 61a generates heat. In this way, the first exhaust purification catalyst in the present embodiment is formed so that by electrifying the upstream side catalyst 61, the upstream side catalyst 61 itself generates heat and rises in temperature. The electrification of the upstream side catalyst 61 is controlled by the electronic control unit 30.

The configuration of the electrical heating catalyst is not limited to this. It is possible to employ any structure which generates heat by the supply of voltage. For example, in the substrate of the upstream side catalyst in the present embodiment, the plate shaped members are formed from metal, but the invention is not limited to this. The substrate may also be formed from cordierite or another material which has heat resistance. Further, for the configuration of the electrodes, it is possible to employ any configuration which enables application of voltage to the substrate.

Figure 22:
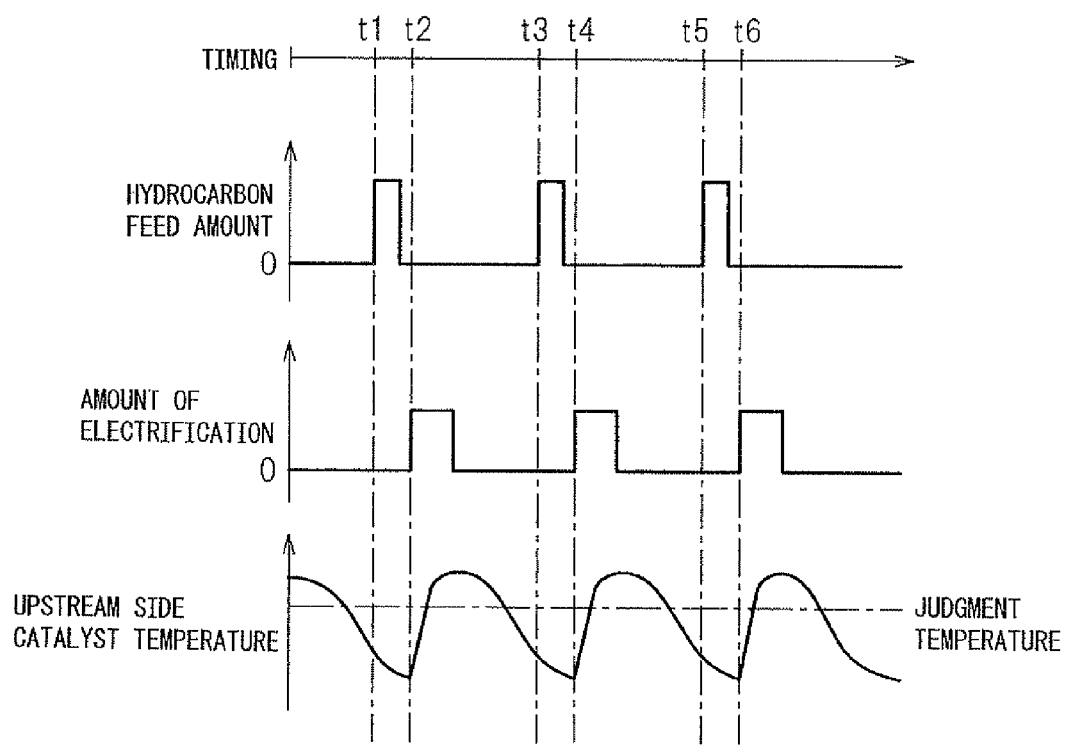
FIG. 22 is a time chart of first operational control in an embodiment.

FIG. 22 shows a time chart of first operational control in the present embodiment. The exhaust purification catalyst 13 in the present embodiment is designed to partially oxidize at least part of the hydrocarbons at the upstream side catalyst 61 and supply them to the downstream side catalyst 62. For this reason, the upstream side catalyst 61 preferably partially oxidizes and reforms a large amount of hydrocarbons.

To partially oxidize the large amount of hydrocarbons at the upstream side catalyst 61, when the hydrocarbons are fed from the hydrocarbon feed valve 15, it is preferable to prevent the hydrocarbons from slipping through the upstream side catalyst 61. To hold the large amount of hydrocarbons which is fed from the hydrocarbon feed valve 15 at the upstream side catalyst 61, it is possible to lower the temperature of the upstream side catalyst 61 to adsorb the hydrocarbons.

On the other hand, to partially oxidize the hydrocarbons, the temperature of the upstream side catalyst 61 is preferably high. The hydrocarbons which are fed from the hydrocarbon feed valve 15 are liquid. If the temperature of the upstream side catalyst 61 is low, the hydrocarbons physically are adsorbed at the upstream side catalyst in the liquid state. In such a temperature region, the efficiency of the partial oxidation is low. In this regard, if the temperature of the upstream side catalyst 61 becomes high, the hydrocarbons vaporize and become higher in reactivity so the efficiency of partial oxidation becomes higher. The hydrocarbons are chemically adsorbed at the acid points etc. of the catalyst particles even if vaporized. The adsorbed hydrocarbons are partially oxidized on the surfaces of the catalyst particles. That is, even if the temperature of the upstream side catalyst 61 rises, the hydrocarbons can be held until being partially oxidized.

In the internal combustion engine in the present embodiment, fuel comprised of diesel oil is fed from the hydrocarbon feed valve 15. As the temperature at which the hydrocarbons vaporize and the efficiency of partial oxidation rises, the approximately 300° C. at which diesel oil vaporizes can be illustrated. In the present invention, the temperature where the efficiency of partial oxidation of the hydrocarbons which flow into the upstream side catalyst reaches a predetermined value is called the "high efficiency temperature". By making the upstream side catalyst the high efficiency temperature or more, it is possible to make the efficiency of the partial oxidation a predetermined efficiency or more. The high efficiency temperature is a temperature dependent on the type of fuel etc. For example, it is possible to set the temperature at which hydrocarbons vaporize. In the exhaust purification system in the present embodiment, the high efficiency temperature can be set to 300° C.

The upstream side catalyst 61 in the present embodiment is a so-called oxidation catalyst and has an activation temperature at which the oxidation ability becomes higher than a predetermined value. The activation temperature of the upstream side catalyst 61 in the present embodiment is about 200° C. The high efficiency temperature of the upstream side catalyst 61 in the present embodiment is higher than the activation temperature. That is, by the temperature of the upstream side catalyst 61 becoming a temperature higher than the high efficiency temperature in the region of a temperature higher than the activation temperature, it is possible to render the hydrocarbons into a state rich in reactivity and possible to make a large amount of hydrocarbons partially oxidize.

The temperature control device of the present embodiment performs control so that during the time period when feeding hydrocarbons to the upstream side catalyst 61 in a single feed operation of hydrocarbons, the temperature of the upstream side catalyst 61 becomes less than the high efficiency temperature. The temperature control device performs control so that the temperature of the upstream side catalyst 61 becomes the high efficiency temperature or more after feeding the hydrocarbons.

In the present embodiment, the temperature of the upstream side catalyst 61 is detected. When the temperature of the upstream side catalyst 61 is less than the high efficiency temperature in the time period when feeding the hydrocarbons, the upstream side catalyst 61 is raised in temperature so that the temperature of the upstream side catalyst 61 becomes higher than the high efficiency temperature after feeding the hydrocarbons.

Referring to FIG. 22, in the exhaust purification system in the present embodiment, for the temperature of the upstream side catalyst, a judgment temperature is preset. For the judgment temperature in the present embodiment, the high efficiency temperature relating to the partial oxidation is set. The judgment temperature is not limited to this and may be set based on the high efficiency temperature. For example, a temperature which includes a predetermined margin from the high efficiency temperature and therefore is slightly higher than the high efficiency temperature may also be set.

The exhaust purification system of the present embodiment has a time period in which the temperature of the upstream side catalyst becomes less than the judgment temperature during the operating period. For example, when the state of a low demanded load of the internal combustion engine continues, the temperature of the upstream side catalyst becomes less than the judgment temperature. When stopping the vehicle and the internal combustion engine enters an idling state or when the vehicle is running steadily at a low speed, the temperature of the upstream side catalyst becomes less than the judgment temperature. Further, the exhaust purification system of the present embodiment has a time period during which the temperature of the upstream side catalyst becomes the judgment temperature or more during the operating period. For example, when the state of a high demanded load of the internal combustion engine continues, the temperature of the upstream side catalyst becomes the judgment temperature or more.

The internal combustion engine in the present embodiment has a time period during which the temperature of the upstream side catalyst becomes less than the judgment temperature and a time period during which it becomes the judgment temperature or more during the operating period, but the invention is not limited to this. It is also possible for the upstream side catalyst to constantly become less than the high efficiency temperature in the ordinary operating state. For example, in internal combustion engine with a good fuel efficiency where the fuel consumption is improved, the temperature of the exhaust becomes lower. For this reason, sometimes the temperature of the upstream side catalyst becomes less than the judgment temperature in the ordinary operating state. The present invention may be applied to such an internal combustion engine as well.

In the example which is shown in FIG. 22, at the time when feeding hydrocarbons from the hydrocarbon feed valve, the temperature of the upstream side catalyst 61 becomes less than the judgment temperature. For this reason, after feeding hydrocarbons from the hydrocarbon feed valve 15, the upstream side catalyst 61 is electrified. By electrifying the upstream side catalyst 61, it is possible to make the temperature of the upstream side catalyst 61 rise to the judgment temperature or more.

At the time t1, hydrocarbons are fed from the hydrocarbon feed valve 15. At the time t2 after feeding the hydrocarbons, the upstream side catalyst 61 is electrified. By electrifying the upstream side catalyst 61, a state is shifted to where the temperature of the upstream side catalyst 61 becomes the judgment temperature or more. After this, electrification of the upstream side catalyst 61 is stopped whereby the temperature of the upstream side catalyst 61 falls. The temperature of the upstream side catalyst 61 becomes less than the judgment temperature. The time period from the time t1 to the time t3 is the time period for one feed operation of hydrocarbons.

At the time t3 on, the control from the time t1 to the time t3 is repeated. That is, at the time t3, hydrocarbons are fed to the upstream side catalyst 61 and, at the time t4, the upstream side catalyst 61 is electrified. At the time t5, hydrocarbons are fed to the upstream side catalyst 61 and, at the time t6, the upstream side catalyst 61 is electrified.

In the time period from the time t1 to the time t2, the temperature of the upstream side catalyst 61 is less than the judgment temperature, so it is possible to promote the adsorption of hydrocarbons which are fed from the hydrocarbon feed valve 15. That is, it is possible to cause a large amount of hydrocarbons to be adsorbed at the upstream side catalyst 61. After that, at the time t2, electrification is performed so that the temperature of the upstream side catalyst 61 rises and becomes the high efficiency temperature or more. For this reason, it is possible to promote the partial oxidation of the hydrocarbons which were adsorbed at the upstream side catalyst 61.

In the internal combustion engine in the present embodiment, it is possible to make a large amount of hydrocarbons be adsorbed at the upstream side catalyst and, furthermore, possible to promote partial oxidation of the adsorbed hydrocarbons. For this reason, it is possible to partially oxidize a large amount of hydrocarbons at the upstream side catalyst and feed it to the downstream side catalyst. As a result, it is possible to improve the rate of removal of $NO_x$.

Note that, in the internal combustion engine of the present embodiment, when feeding hydrocarbons from the hydrocarbon feed valve according to the operating conditions, sometimes the temperature of the upstream side catalyst is the judgment temperature or more. For example, when a high load operation continues, the temperature of the exhaust rises, whereby sometimes the temperature of the upstream side catalyst is maintained at the judgment temperature or more. The exhaust purification system in the present embodiment detects the temperature of the upstream side catalyst before the timing for electrification and performs control to not electrify the upstream side catalyst when the temperature of the upstream side catalyst is the judgment temperature or more.

Figure 23:
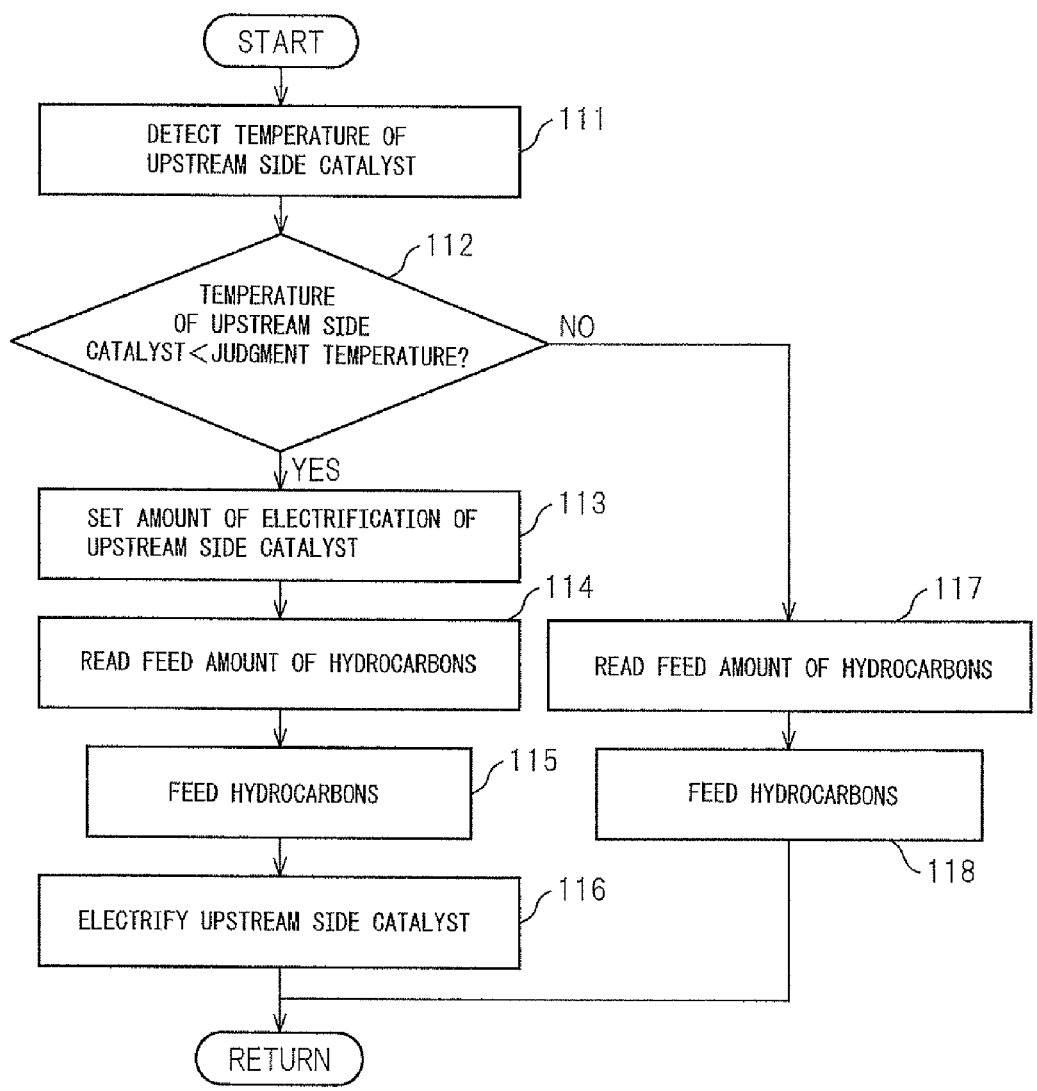
FIG. 23 is a flow chart of first operational control in an embodiment.

FIG. 23 shows a flow chart of first operational control of the internal combustion engine in the present embodiment. At step 111, the temperature of the upstream side catalyst 61 is detected. Referring to FIG. 1, the temperature of the upstream side catalyst 61 can be detected by the temperature sensor 23. In the present embodiment, the temperature of the upstream side catalyst 61 is detected right before feeding the hydrocarbons. The detection of the temperature of the upstream side catalyst is not limited to this. It is also possible to perform it during the time period when the hydrocarbons are being fed or right after the hydrocarbons finish being fed.

At step 112, it is judged if the temperature of the upstream side catalyst 61 is less than a predetermined judgment temperature. When the temperature of the upstream side catalyst 61 is less than the predetermined judgment temperature, the routine proceeds to step 113.

At step 113, the amount of electrification of the upstream side catalyst 61 is set. For example, the voltage to be supplied to the substrate of the upstream side catalyst 61 or the electrification time is set. In the present embodiment, the difference between the predetermined judgment temperature and the temperature of the upstream side catalyst is used as the basis to set the amount of electrification of the upstream side catalyst. In the present embodiment, control is performed so that the larger the difference between the temperature of the upstream side catalyst and the temperature judgment value, the greater the amount of rise of the temperature of the upstream side catalyst. That is, control is performed to increase the amount of electrification of the upstream side catalyst. The amount of electrification of the upstream side catalyst can, for example, be stored in advance in the electronic control 30 as a function of the difference between the judgment temperature and the temperature of the upstream side catalyst.

Next, at step 114, the amount of feed of hydrocarbons is read. The amount of feed of hydrocarbons can be set based on the engine speed etc. by the above-mentioned control (see FIG. 16 etc.) Next, at step 115, the read amount of feed of hydrocarbons is fed from the hydrocarbon feed valve. The temperature of the upstream side catalyst 61 is less than the judgment temperature, so hydrocarbons can be efficiently adsorbed.

Next, at step 116, after the feed of hydrocarbons, the upstream side catalyst 61 is electrified by the amount of electrification which was set at step 113. The temperature of the upstream side catalyst 61 can be made the judgment temperature or more for efficient partial oxidation.

When, at step 112, the temperature of the upstream side catalyst 61 is the judgment temperature or more, the routine proceeds to step 117. In this case, the upstream side catalyst 61 has become a temperature which enables sufficient partial oxidation of the hydrocarbons. For this reason, hydrocarbons are fed without electrification of the upstream side catalyst 61.

At step 117, in the same way as step 114, the amount of feed of hydrocarbons is read. Next, at step 118, hydrocarbons are fed by the read amount of feed.

In this way, in the first operational control of the present embodiment, the temperature control device performs control to make the temperature of the upstream side catalyst rise after the exhaust purification catalyst is fed with hydrocarbons and the upstream side catalyst 61 adsorbs hydrocarbons.

For example, the exhaust purification system can perform control to raise the temperature of the exhaust or to electrify the upstream side catalyst so that the temperature of the upstream side catalyst constantly becomes the high efficiency temperature or more. However, in this case, the amount of adsorption of hydrocarbons becomes smaller and the amount of hydrocarbons which slip through the upstream side catalyst becomes greater. Alternatively, to increase the amount of adsorption of hydrocarbons, it is possible to constantly maintain the temperature of the upstream side catalyst at less than the high efficiency temperature. However, in this case, the efficiency at the time of partial oxidation becomes lower.

By providing a time period of a low temperature for adsorption of hydrocarbons and a time period of a high temperature for partial oxidation of hydrocarbons like in the exhaust purification system of the present embodiment, it is possible to adsorb a greater amount of hydrocarbons and possible to efficiently reform the adsorbed hydrocarbons. Note that, in the present embodiment, electrification of the upstream side catalyst starts after the time period of feeding the hydrocarbons ends. That is electrification of the upstream side catalyst starts after hydrocarbons are adsorbed there, but the invention is not limited to this. It is also possible to start the electrification of the upstream side catalyst during the time period while feeding the hydrocarbons.

The time during which electrification of the upstream side catalyst is performed in operational control in the present embodiment is a short time after the feed of hydrocarbons from the hydrocarbon feed valve. For this reason, it is possible to reduce the amount consumed power compared with operational control which continuously electrifies the upstream side catalyst to constantly maintain the temperature of the upstream side catalyst at the high efficiency temperature or more.

The temperature control device in the first operational control of the present embodiment electrifies the upstream side catalyst which functions as an electric heating catalyst so as to raise the temperature of the upstream side catalyst, but the invention is not limited to this. The temperature control device can adjust the temperature of the upstream side catalyst by any device and by any control.

Figure 24:
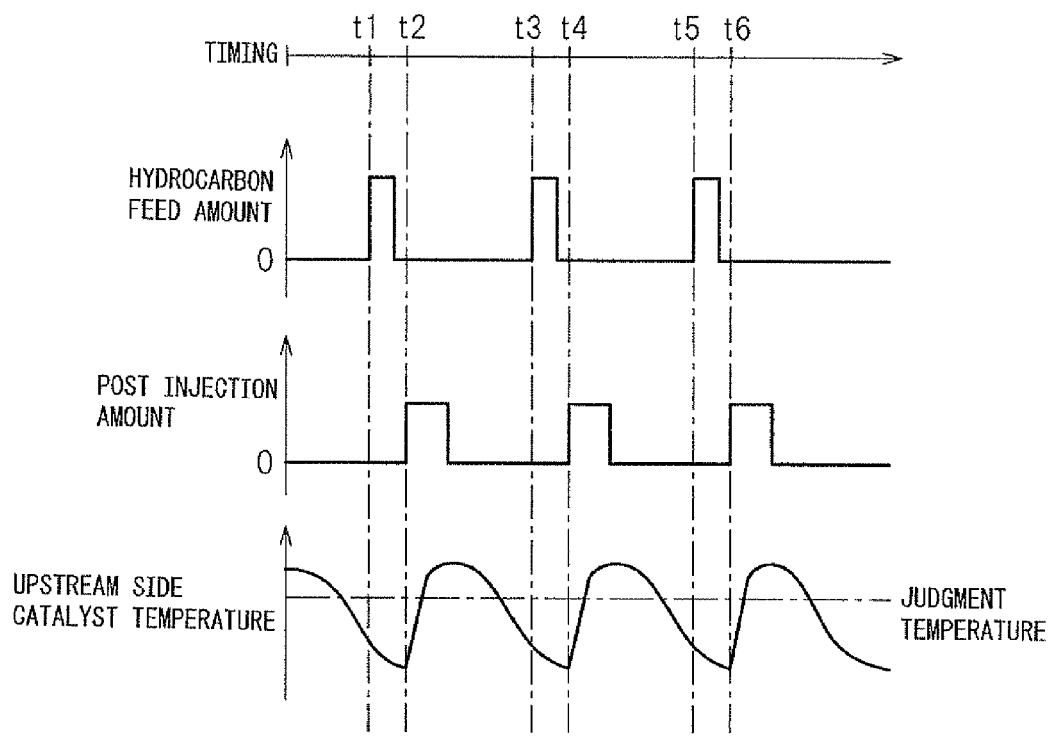
FIG. 24 is a time chart of second operational control in an embodiment.

FIG. 24 shows a time chart of a second operational control in the present embodiment. The temperature control device in the second operational control performs auxiliary injection so as to raise the temperature of the upstream side catalyst after the main injection which generates the output in the combustion chambers. By performing the auxiliary injection, lighter fuel is fed to the upstream side catalyst. By oxidation of the light fuel at the upstream side catalyst, the temperature of the upstream side catalyst rises.

The auxiliary injection in the second operational control of the present embodiment performs post injection in which fuel is injected in the combustion chambers in the time period when not burning. The post injection can, for example, be performed in the time period of the second half of the expansion stroke. The fuel which was injected by the auxiliary injection at least partially becomes light since the combustion chambers are high in temperature. Light fuel is easily oxidized at the upstream side catalyst since the oxidation reaction easily occurs, so the temperature of the upstream side catalyst can be raised. Note that, when performing the second operational control, to oxidize light fuel at the upstream side catalyst, the air-fuel ratio of the exhaust which flows into the upstream side catalyst is preferably lean.

In the example which is shown in FIG. 24, at the time t1, the hydrocarbon feed valve feeds hydrocarbons. At the time t2, post injection is started as auxiliary injection. By performing post injection, the temperature of the upstream side catalyst shifts from a state of less than the judgment temperature to a state of the judgment temperature or more. By stopping the post injection, the temperature of the upstream side catalyst falls to the original temperature. The temperature of the upstream side catalyst becomes less than the judgment temperature.

At the time t3, hydrocarbons are again fed. The operational control from the time t3 on is performed by repeating the control from the time t1 to the time t3. In this way, by performing auxiliary injection in the combustion chambers, the temperature of the upstream side catalyst can be raised to the judgment temperature or more. Further, by stopping the auxiliary injection, the temperature of the upstream side catalyst can be lowered to less than the judgment temperature.

The second operational control of the present embodiment can raise the temperature of the upstream side catalyst even without using an electric heating catalyst. That is, control may be performed to raise the temperature of the upstream side catalyst and control may be performed to lower the temperature by changing the fuel injection control in the combustion chambers.

In the second operational control of the present embodiment, the auxiliary injection injects fuel at a time period when fuel is not being burned, but the invention is not limited to this. It is also possible to inject fuel in a time period when part of the fuel is being burned. For example, as the auxiliary injection, it is also possible to perform after injection in which part of the fuel is burned so as to feed light hydrocarbons to the upstream side catalyst.

Figure 25:
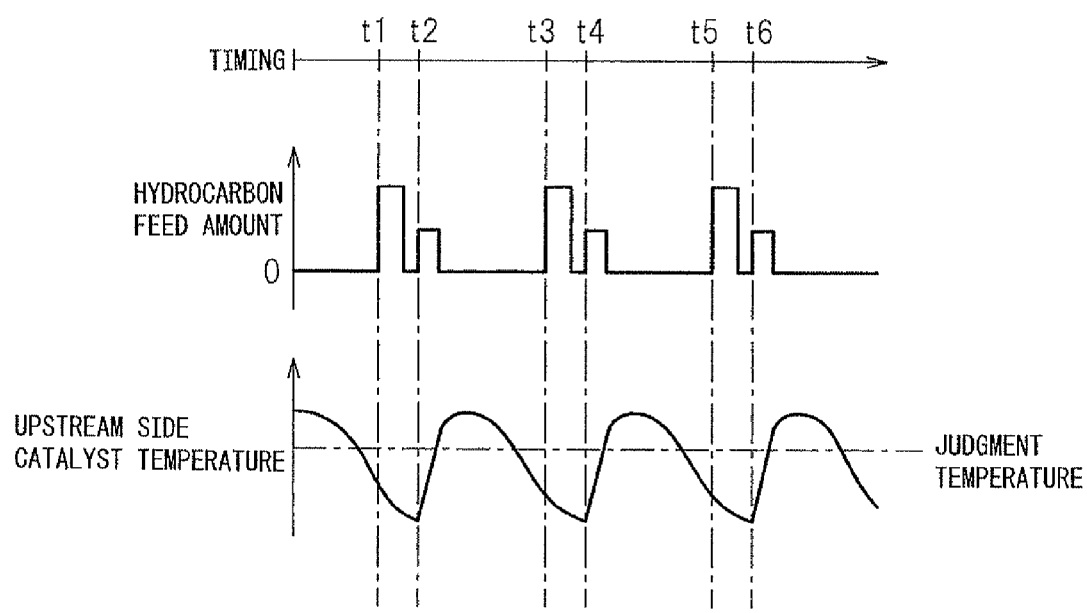
FIG. 25 is a time chart of third operational control in an embodiment.

FIG. 25 is a time chart of a third operational control in an internal combustion engine in the present embodiment. The temperature control device of the third operational control feeds hydrocarbons from the hydrocarbon feed valve 15 for removal of $NO_X$, then further feeds a small amount of hydrocarbons so as to raise the temperature of the upstream side catalyst 61. At the upstream side catalyst 61, an oxidation reaction can be caused and the heat of oxidation of the hydrocarbons can be used to raise the temperature of the upstream side catalyst 61.

In the example which is shown in FIG. 25, at the time t1, the hydrocarbon feed valve 15 feeds hydrocarbons, and the upstream side catalyst 61 is made to adsorb hydrocarbons. In the present embodiment, when making it adsorb the hydrocarbons, the air-fuel ratio of the exhaust which flows into the upstream side catalyst 61 is rich. For this reason, oxidation of the hydrocarbons at the upstream side catalyst 61 is suppressed.

At the time t2, hydrocarbons start being fed by an amount of feed which is smaller than the feed of hydrocarbons which was started at the time t1. When feeding hydrocarbons from the time t2, control is performed so that the air-fuel ratio of the exhaust which flows into the upstream side catalyst 61 becomes lean. For this reason, by feeding hydrocarbons from the time t2, an oxidation reaction occurs at the upstream side catalyst 61 and it is possible to raise the temperature. From the time t3 on, the control which is performed from the time t1 to the time t3 is repeated.

In the third operational control of the present embodiment, the hydrocarbon feed valve 15 feeds hydrocarbons so as to raise the temperature of the upstream side catalyst 61. For this reason, it is possible to feed hydrocarbons for raising the temperature to the upstream side catalyst without performing post injection or other auxiliary injection at the combustion chambers. For example, by performing post injection etc. frequently, the fuel which deposits on the wall surfaces of the cylinders increases. The fuel which deposits on the wall surfaces at the insides of the cylinders flows through the contacting surfaces of the wall surfaces of the cylinders and the pistons to the inside of the crankcase and is mixed with the lubrication oil. If the amount of fuel which is mixed with the lubrication oil becomes greater, the lubrication oil sometimes is degraded or spoiled.

In the third operational control of the present embodiment, it is possible to avoid auxiliary injection at the combustion chamber for raising the temperature of the upstream side catalyst and suppress spoilage or degradation of the lubrication oil of the engine body. Further, it is possible to raise the temperature of the upstream side catalyst even without using an electric heating catalyst.

In this regard, the temperature control device which adjusts the temperature of the upstream side catalyst is not limited to a device which raises the temperature of the upstream side catalyst. It may also be a device which lowers the temperature of the upstream side catalyst. For example, in an internal combustion engine in which the upstream side catalyst is maintained at a temperature higher than the high efficiency temperature during the operational period, the temperature of the upstream side catalyst can be lowered. In particular, it is possible to lower the upstream side catalyst to less than the high efficiency temperature before feeding hydrocarbons from the hydrocarbon feed valve. By lowering the temperature of the upstream side catalyst, it is possible to increase the amount of adsorption of hydrocarbons at the upstream side catalyst. By using the hydrocarbon feed valve to feed hydrocarbons, then stopping control for lowering the temperature, it is possible to raise the temperature of the upstream side catalyst. By making the upstream side catalyst the high efficiency temperature or more, it is possible to partially oxidize the hydrocarbons efficiently.

As the device for lowering the temperature of the upstream side catalyst, for example, it is possible to feed hydrocarbons from the hydrocarbon feed valve so that the air-fuel ratio of the exhaust which flows into the upstream side catalyst becomes rich and, further, to make the amount of feed of hydrocarbons a desired amount or more. Alternatively, a cooling device which lowers the temperature of the upstream side catalyst may also be arranged. For example, a cooling device which lowers the temperature of the upstream side catalyst may also be arranged around the upstream side catalyst. Alternatively, a cooling device which cools the exhaust may also be arranged upstream from the upstream side catalyst in the engine exhaust passage.

In the exhaust purification catalyst of the present embodiment, an oxidation catalyst is arranged at the upstream side and a catalyst on which precious metal catalyst particles are carried and which has basic exhaust flow surface parts is arranged at the downstream side, but the invention is not limited to this. For the upstream side catalyst, any catalyst which has an oxidation ability can be employed. Furthermore, for the upstream side catalyst, any catalyst which can partially oxidize and reform hydrocarbons can be employed. For example, the upstream side catalyst may have a configuration of catalyst particles similar to the configuration of catalyst particles of the three-way catalyst. Alternatively, the upstream side catalyst may have a configuration similar to the downstream side catalyst in the present embodiment. That is, the upstream side catalyst may also have precious metal catalyst particles and basic exhaust flow surfaces parts which are formed around the catalyst particles.

When the upstream side catalyst has a configuration similar to the downstream side catalyst in the present embodiment, in the first $NO_X$ removal method, it is possible to produce reducing intermediates at the upstream side catalyst. When the concentration of hydrocarbons of the exhaust which flows into the upstream side catalyst is low, the $NO_X$ is activated and active $NO_X$ is produced. The produced active $NO_X$ is held on the surface of the basic layer. If the concentration of hydrocarbons of the exhaust becomes high, the hydrocarbons are partially oxidized and radicals of the hydrocarbons are produced. The active $NO_X$ and the partially oxidized hydrocarbons react whereby reducing intermediates are produced. In the upstream side catalyst as well, the produced reducing intermediates can be used to reduce and remove the $NO_X$. Alternatively, the reducing intermediates which are produced at the upstream side catalyst can be fed to the downstream side catalyst.

Even when the upstream side catalyst has a configuration similar to the downstream side catalyst in the present embodiment, it is possible to perform the second $NO_X$ removal method in the present embodiment. That is, by lengthening the feed intervals of hydrocarbons from the hydrocarbon feed valve, the upstream side catalyst functions as an $NO_X$ storage catalyst. By making the upstream side catalyst and downstream side catalyst function as $NO_X$ storage catalysts, it is possible to increase the capacity when performing the second $NO_X$ removal method.

When both of the upstream side catalyst and downstream side catalyst are catalysts which have precious metal catalyst particles and basic exhaust flow surface parts, it is also possible to employ an electric heating catalyst for the downstream side catalyst. Alternatively, both of the upstream side catalyst and the downstream side catalyst may be electric heating catalysts. That is, it is possible to form at least one of the upstream side catalyst and downstream side catalyst by an electric heating catalyst.

Figure 26:
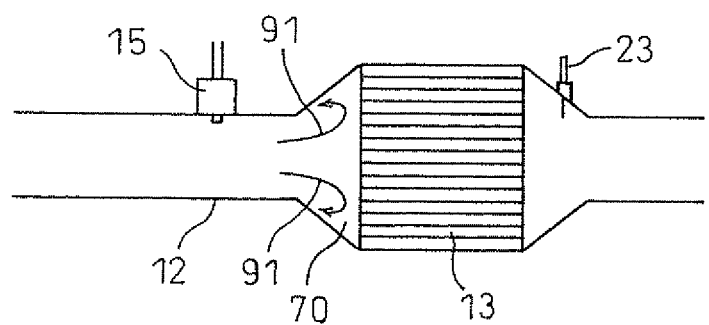
FIG. 26 is a schematic cross-sectional view of a second exhaust purification catalyst in an embodiment.

FIG. 26 shows a schematic cross-sectional view of the second exhaust purification catalyst in the present embodiment. The exhaust purification catalyst in the above embodiment is divided into an upstream side catalyst and a downstream side catalyst. In the second exhaust purification catalyst, a catalyst is employed in which the upstream side catalyst and the downstream side catalyst are formed integrally. The exhaust purification catalyst 13, in the same way as the downstream side catalyst of the first exhaust purification catalyst, has a metal which has a catalytic action and basic exhaust flow surface parts which are formed around the catalyst particles. In the present embodiment, at the surface of the catalyst carrier, precious metal catalyst particles and a basic layer are arranged.

The second exhaust purification catalyst 13 is comprised of an electric heating catalyst. At the upstream side of the second exhaust purification catalyst 13, a hydrocarbon feed valve 15 is arranged. At the downstream side of the second exhaust purification catalyst 13, a temperature sensor 23 is arranged which detects the temperature of the second exhaust purification catalyst 13.

In the second exhaust purification catalyst 13 as well, the first $NO_X$ removal method in the present embodiment can be used to remove $NO_X$. That is, it is possible to make the concentration of hydrocarbons which flow into the second exhaust purification catalyst 13 vibrate by within a predetermined range of amplitude and by within a predetermined range of period so as to remove the $NO_X$. In this case, the second exhaust purification catalyst 13 functions as the upstream side catalyst and, furthermore, functions as the downstream side catalyst in the first exhaust purification catalyst. That is, inside the second exhaust purification catalyst 13, hydrocarbons are reformed to a radical state. Furthermore, reducing intermediates are produced by the reformed hydrocarbons and active $NO_X$. The produced reducing intermediates can be used to remove the $NO_X$. Alternatively, in the second exhaust purification catalyst 13 as well, it is possible to perform the second $NO_X$ removal method in the present embodiment.

In the second exhaust purification catalyst 13 as well, it is possible to perform the operational control in the present embodiment. The second exhaust purification catalyst 13 has a high efficiency temperature at which partial oxidation is possible by a predetermined efficiency when partially oxidizing the hydrocarbons. The temperature control device can adjust the temperature of the second exhaust purification catalyst so that it becomes less than the high efficiency temperature in the time period when feeding the hydrocarbons and becomes the high efficiency temperature or more after feeding the hydrocarbons. By performing this control, it is possible to efficiently partially oxidize the hydrocarbons and improve the $NO_X$ removal rate.

In this regard, in the second exhaust purification catalyst which is shown in FIG. 26, a distribution of speed of the exhaust occurs inside of the exhaust pipe 12 at the upstream side from the exhaust purification catalyst 13. That is, at the approximate center of the exhaust pipe 12, the speed of the exhaust is large. The closer to the inside walls of the exhaust pipe 12, the slower the speed of the exhaust becomes. Furthermore, at the enlarged cross-section part 70 where the inside diameter of the engine exhaust passage becomes gradually larger, as shown by the arrow 91, sometimes an eddy flow occurs in the exhaust. The hydrocarbons which are fed from the hydrocarbon feed valve 15 are diffused due to the distribution of speed of the exhaust at the inside of the exhaust pipe 12 and the disturbances in flow of exhaust at the enlarged cross-section part 70. For this reason, sometimes the concentration of hydrocarbons of the exhaust which flows into the substrate of the exhaust purification catalyst 13 becomes lower and the concentration of hydrocarbons becomes uneven.

Figure 27:
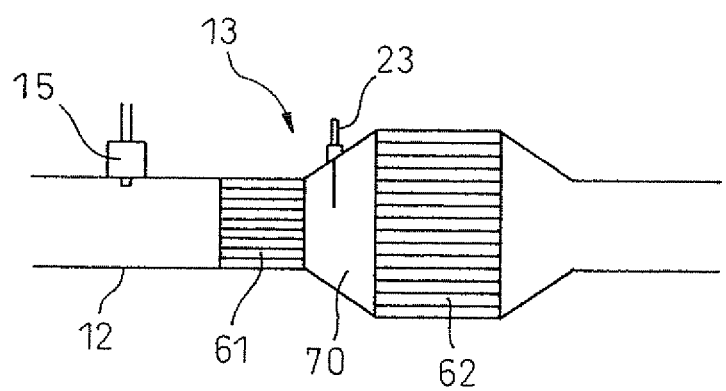
FIG. 27 is a schematic cross-sectional view of a third exhaust purification catalyst in an embodiment.

FIG. 27 shows a schematic cross-sectional view of a third exhaust purification catalyst in the present embodiment. The third exhaust purification catalyst 13 includes an upstream side catalyst 61 and a downstream side catalyst 62. The substrate of the upstream side catalyst 61 and the substrate of the downstream side catalyst 62 are formed in cylindrical shapes. The diameter of the substrate of the upstream side catalyst 61 is formed smaller than the diameter of the substrate of the downstream side catalyst 62.

In the third exhaust purification catalyst 13, a small diameter substrate is employed for the upstream side catalyst 61. The channel cross-sectional area of the exhaust pipe 12 is small, so it is possible to suppress diffusion of the hydrocarbons which are contained in the exhaust which flows into the upstream side catalyst 61. Further, the channels inside of the upstream side catalyst 61 are small in inside diameters, so the speed of the exhaust when passing through the inside channels is made uniform. When the exhaust flows out from the upstream side catalyst 61, the speed of the exhaust is made uniform. For this reason, it is possible to keep eddies etc. from occurring at the enlarged cross-section part 70 and feed exhaust with a uniform concentration of hydrocarbons to the downstream side catalyst 62. Alternatively, it is possible to keep the hydrocarbons from diffusing and the concentration of hydrocarbons which flow into the downstream side catalyst 62 from becoming lower.

In this regard, in the third exhaust purification catalyst 13, the upstream side end face of the upstream side catalyst 61 is small in area, so the density of the hydrocarbons which are contained in the exhaust becomes higher. For example, sometimes the air-fuel ratio of the exhaust which flows into the upstream side catalyst 61 becomes rich. For this reason, it becomes difficult to cause oxidation of the hydrocarbons and raise the temperature inside of the exhaust purification catalyst 13. In an exhaust purification catalyst 13 where the upstream side catalyst 61 is small in size in this way, it is possible to make the upstream side catalyst 61 from an electric heating catalyst. In the third exhaust purification catalyst as well, by raising the temperature of the upstream side catalyst 61 after feeding the hydrocarbons, it is possible to efficiently feed partially oxidized hydrocarbons to the downstream side catalyst 62.

Further, the substrate of the upstream side catalyst and the substrate of the downstream side catalyst in the above embodiments are formed in cylindrical shapes, but the invention is not limited to this. Any shapes may be employed.

Figure 28A:
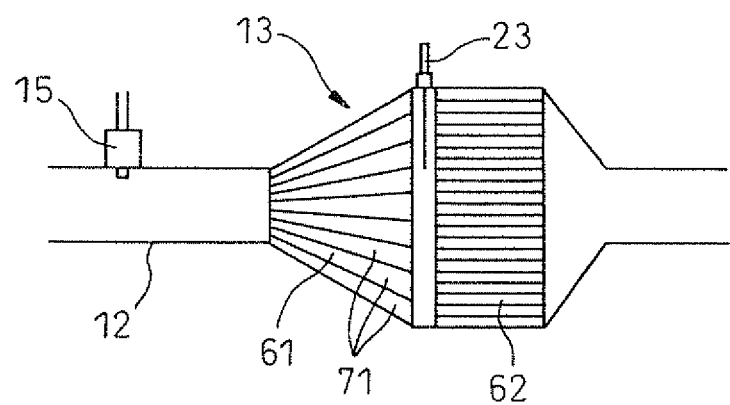
FIG. 28A is a schematic cross-sectional view of a fourth exhaust purification catalyst in an embodiment.
Figure 28B:
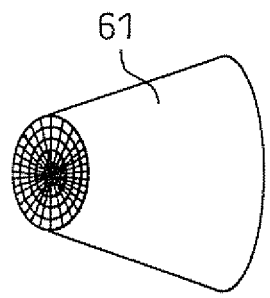
FIG. 28B is a schematic perspective view of an upstream side catalyst of the fourth exhaust purification catalyst in an embodiment.

FIG. 28A shows a schematic cross-sectional view of a fourth exhaust purification catalyst in the present embodiment. FIG. 28B shows a schematic perspective view of an upstream side catalyst of the fourth exhaust purification catalyst in the present embodiment. The fourth exhaust purification catalyst 13 includes an upstream side catalyst 61 and a downstream side catalyst 62. The upstream side catalyst 61 has a shape wherein the diameter of the substrate becomes gradually larger in diameter along the direction of flow of the exhaust. The substrate of the upstream side catalyst 61 has a shape of a conical pyramid from which the pointed end is cut off. The plurality of channels 71 which are formed inside of the upstream side catalyst 61 gradually become larger in channel cross-sectional areas along the direction of flow of the exhaust. The downstream side catalyst 62 is formed in a cylindrical shape.

In the fourth exhaust purification catalyst, the diameter of the upstream side catalyst 61 becomes gradually larger along the direction of flow of the exhaust, so it is possible to suppress disturbances in the flow of exhaust at the enlarged cross-section part. The channel cross-sectional areas of the channels 71 at the inside of the substrate are small, so eddies and other disturbances in the flow do not easily occur inside the plurality of channels 71. When exhaust flows out from the upstream side catalyst 61, the speed of the exhaust is made uniform. For this reason, it is possible to make the concentration of hydrocarbons which flows into the downstream side catalyst 62 substantially uniform. Alternatively, it is possible to keep the hydrocarbons which are contained in the exhaust from diffusing and the concentration of hydrocarbons which flow into the downstream side catalyst 62 from becoming lower.

In the upstream side catalyst 61 of the fourth exhaust purification catalyst as well, the area of the end face of the substrate to which the exhaust flows is small, so the density of the hydrocarbons becomes larger. However, the upstream side catalyst 61 may also be comprised of an electrical heating catalyst. In the fourth exhaust purification catalyst as well, by raising the temperature of the upstream side catalyst 61 after feeding the hydrocarbons, it is possible to efficiently feed partially oxidized hydrocarbons to the downstream side catalyst 62.

In the above control routines, the order of the steps may be suitably changed within a range not changing the functions and actions. The above embodiments may be suitably combined. In the above figures, the same or equivalent parts are assigned the same reference notations. Note that the above embodiments are illustrative and do not limit the invention. Further, the embodiments include changes which are shown in the claims.

REFERENCE SIGNS LIST

2 combustion chamber
3 fuel injector
13 exhaust purification catalyst
15 hydrocarbon feed valve
30 electronic control unit
50 catalyst carrier
51 catalyst particles
54 catalyst carrier
55,56 catalyst particles
57 basic layer
58 exhaust flow surface part
61 upstream side catalyst
62 downstream side catalyst
70 enlarged cross-section part

The invention claimed is:

1. An exhaust purification system of an internal combustion engine comprising:
an engine exhaust passage;
an exhaust purification catalyst inside of the engine exhaust passage for causing $NO_x$ that is contained in an exhaust and hydrocarbons to react, wherein
the exhaust purification catalyst comprises an upstream side catalyst and a downstream side catalyst, wherein
the upstream side catalyst has an oxidation ability, and
the downstream side catalyst carries precious metal catalyst particles on an exhaust flow surface and is formed with basic exhaust flow surface parts around the catalyst particles;

a temperature control device that adjusts a temperature of the upstream side catalyst; and an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein when the electronic control unit controls the vibration of the concentration of hydrocarbons flowing into the exhaust purification catalyst within the predetermined range of amplitude and within the predetermined range of period, the exhaust purification catalyst has a property of chemically reducing the $NO_x$ that is contained in the exhaust without storing, or storing a fine amount of nitrates in the basic exhaust flow surface parts, produces a reducing intermediate containing nitro and hydrocarbons that chemically reduces the $NO_x$ contained in the exhaust by a reducing action of the produced reducing intermediate, and partially oxidizing at least part of the hydrocarbons at the upstream side catalyst, and when the electronic control unit controls the vibration period of the concentration of hydrocarbons longer than the predetermined range of period, the exhaust purification catalyst has a property of increasing a storage amount of $NO_x$ that is contained in the exhaust, when partially oxidizing the hydrocarbons, the upstream side catalyst has a high efficiency temperature at which partial oxidation occurs at a predetermined efficiency, and the temperature control device adjusts the temperature of the upstream side catalyst so that the upstream side catalyst becomes less than the high efficiency temperature in the time period when feeding hydrocarbons, and the upstream side catalyst becomes the high efficiency temperature or more after feeding the hydrocarbons.

2. The exhaust purification system of an internal combustion engine as set forth in claim 1, wherein the temperature control device causes the temperature of the upstream side catalyst to rise after the exhaust purification catalyst is fed hydrocarbons, and hydrocarbons are adsorbed at the upstream side catalyst.

3. The exhaust purification system of an internal combustion engine as set forth in claim 1, wherein a judgment temperature of the upstream side catalyst is determined in advance based on the high efficiency temperature of the upstream side catalyst, and the temperature control device detects the temperature of the upstream side catalyst and, when the temperature of the upstream side catalyst is less than the judgment temperature, uses a difference between the judgment temperature and the temperature of the upstream side catalyst as the basis to cause the temperature of the upstream side catalyst rise.

4. The exhaust purification system of an internal combustion engine as set forth in claim 1, wherein the upstream side catalyst is comprised of an electric heating catalyst, and the temperature control device electrifies the upstream side catalyst to raise the temperature of the upstream side catalyst.

5. The exhaust purification system of an internal combustion engine as set forth in claim 1, wherein the temperature control device performs auxiliary injection after main injection for generating output at combustion chambers to feed light fuel to the upstream side catalyst, and causes the temperature of the upstream side catalyst to rise by oxidation of fuel at the upstream side catalyst.

6. The exhaust purification system of an internal combustion engine as set forth in claim 1, wherein the exhaust purification catalyst is a catalyst comprised of an upstream side catalyst and a downstream side catalyst that are formed integrally.

* * * * *